United States Patent
Sarig et al.

(10) Patent No.: US 10,813,723 B2
(45) Date of Patent: Oct. 27, 2020

(54) DENTAL CONNECTION SYSTEM

(71) Applicant: MIS Implants Technologies Ltd., Doar-Na Misgav (IL)

(72) Inventors: Dror Sarig, Doar-Na Misgav (IL); Thaer Sliman, Akko (IL)

(73) Assignee: MIS Implants Technologies Ltd., Misgav (IL)

( * ) Notice: Subject to any disclaimer, the term of this patent is extended or adjusted under 35 U.S.C. 154(b) by 0 days.

(21) Appl. No.: 15/978,237

(22) Filed: May 14, 2018

(65) Prior Publication Data

US 2018/0338818 A1    Nov. 29, 2018

Related U.S. Application Data

(60) Provisional application No. 62/512,119, filed on May 29, 2017.

(51) Int. Cl.
*A61C 8/00* (2006.01)

(52) U.S. Cl.
CPC ............ *A61C 8/0069* (2013.01); *A61C 8/005* (2013.01); *A61C 8/0048* (2013.01); *A61C 8/0066* (2013.01); *A61C 8/0074* (2013.01); *A61C 8/0068* (2013.01); *A61C 8/0075* (2013.01)

(58) Field of Classification Search
CPC ... A61C 8/0069; A61C 8/0074; A61C 8/0075; A61C 8/0066; A61C 8/0048; A61C 8/005
See application file for complete search history.

(56) References Cited

U.S. PATENT DOCUMENTS

| | | | |
|---|---|---|---|
| 5,009,596 A | 4/1991 | Soderberg | |
| 5,125,840 A | 6/1992 | Dürr et al. | |
| 5,316,477 A * | 5/1994 | Calderon | A61C 8/0069 433/172 |
| 5,344,457 A | 9/1994 | Pilliar et al. | |
| 5,667,384 A * | 9/1997 | Sutter | A61C 8/0048 433/172 |
| 5,829,977 A | 11/1998 | Rogers et al. | |
| D414,556 S | 9/1999 | Broberg et al. | |
| 6,030,219 A | 2/2000 | Zuest | |
| 6,358,050 B1 * | 3/2002 | Bergstrom | A61C 8/005 433/173 |
| 6,663,388 B1 * | 12/2003 | Schar | A61C 8/005 433/173 |
| D507,650 S | 7/2005 | Teich | |

(Continued)

FOREIGN PATENT DOCUMENTS

| | | |
|---|---|---|
| CN | 201244094 | 5/2009 |
| WO | WO 2008138852 | * 11/2008 |

(Continued)

OTHER PUBLICATIONS

Notification of Office Action dated Feb. 22, 2018 From the State Intellectual Property Office of the People's Republic of China Re. Application No. 201730565857.2 and Its Translation Into English.

(Continued)

*Primary Examiner* — Edward Moran

(57) ABSTRACT

A base for a dental implant system which includes a long cavity which optionally reaches below the implant top and/or allows a significant portion of a superstructure to be inserted into the cavity and possibly held using axial support.

19 Claims, 22 Drawing Sheets

(56) References Cited

U.S. PATENT DOCUMENTS

| | | | |
|---|---|---|---|
| D528,210 S | 9/2006 | Boettcher | |
| D604,413 S | 11/2009 | Ikeya et al. | |
| D606,196 S | 12/2009 | Fares et al. | |
| 7,699,613 B2 | 4/2010 | Niznick | |
| D663,032 S | 7/2012 | Mashio et al. | |
| D663,419 S | 7/2012 | Mashio et al. | |
| D733,885 S | 7/2015 | Andersin et al. | |
| D752,756 S | 3/2016 | Aravena et al. | |
| D783,823 S | 4/2017 | Emanuelli | |
| D783,825 S | 4/2017 | Emanuelli | |
| D785,179 S | 4/2017 | Emanuelli | |
| D808,016 S | 1/2018 | Kim et al. | |
| 2006/0183078 A1 | 8/2006 | Niznick | |
| 2007/0020582 A1* | 1/2007 | Neumeyer | A61C 8/005 433/173 |
| 2008/0227057 A1* | 9/2008 | Anitua Aldecoa | A61C 8/0001 433/174 |
| 2009/0298013 A1 | 12/2009 | Baruc | |
| 2011/0269105 A1* | 11/2011 | Jahn | A61C 8/005 433/174 |
| 2012/0202169 A1 | 8/2012 | Ryu et al. | |
| 2014/0011160 A1 | 1/2014 | Jorneus et al. | |
| 2014/0141387 A1 | 5/2014 | Kikuchi | |
| 2014/0162212 A1* | 6/2014 | Mullaly | A61C 8/0053 433/173 |
| 2015/0037758 A1* | 2/2015 | Tatum, Jr. | A61C 8/0022 433/174 |
| 2015/0044635 A1* | 2/2015 | Wang | A61C 8/005 433/173 |
| 2016/0045288 A1* | 2/2016 | Lin | A61C 8/008 433/174 |
| 2016/0270877 A1 | 9/2016 | Richard | |
| 2016/0317254 A1 | 11/2016 | Courvoisier et al. | |
| 2018/0116769 A1* | 5/2018 | Seo | A61C 8/0048 |
| 2018/0325633 A1 | 11/2018 | Sarig | |

FOREIGN PATENT DOCUMENTS

| | | |
|---|---|---|
| WO | WO 2017/090037 | 6/2017 |
| WO | WO 2018/220612 | 12/2018 |

OTHER PUBLICATIONS

International Preliminary Report on Patentability dated Jun. 7, 2018 From the International Bureau of WIPO Re. Application No. PCT/IL2016/051259. (7 Pages).

International Search Report and the Written Opinion dated Mar. 20, 2017 From the International Searching Authority Re. Application No. PCT/IL2016/051259. (11 Pages).

Anthogyr "Axiom® Multi Level®—Total Compatibility Between the Bone Level and Tissue Level", Product Description, 1 P., Oct. 3, 2016.

International Search Report and the Written Opinion dated Oct. 16, 2018 From the International Searching Authority Re. Application No. PCT/IL2018/050502. (22 Pages).

Invitation to Pay Additional Fees, Communication Relating to the Results of the Partial International Search and the Provisional Opinion dated Aug. 22, 2018 From the International Searching Authority Re. Application No. PCT/IL2018/050502. (15 Pages).

Notice of Allowance dated Oct. 4, 2018 From the US Patent and Trademark Office Re. U.S. Appl. No. 29/616,214. (19 pages).

Notice of Allowance dated Oct. 4, 2018 From the US Patent and Trademark Office Re. U.S. Appl. No. 29/616,215. (19 pages).

Notification of Reason for Rejection dated Aug. 28, 2018 From the Japanese Patent Office Re. Application No. 2018-001178.

Applicant-Initiated Interview Summary dated Jun. 14, 2019 From the US Patent and Trademark Office Re. U.S. Appl. No. 15/774,013. (3 pages).

Official Action dated Apr. 5, 2019 From the US Patent and Trademark Office Re. U.S. Appl. No. 15/774,013. (18 pages).

Written Opinion dated May 17, 2019 From the International Preliminary Examining Authority Re. Application No. PCT/IL2018/050502. (8 Pages).

Office Action dated Jun. 30, 2019 From the Israel Patent Office Re. Application No. 242816 and Its Translation Into English. (7 Pages).

Official Action dated Sep. 6, 2019 From the US Patent and Trademark Office Re. U.S. Appl. No. 15/774,013. (11 pages).

Office Action dated May 5, 2020 From the Israel Patent Office Re. Application No. 270997 and Its Translation Into English. (7 Pages).

\* cited by examiner

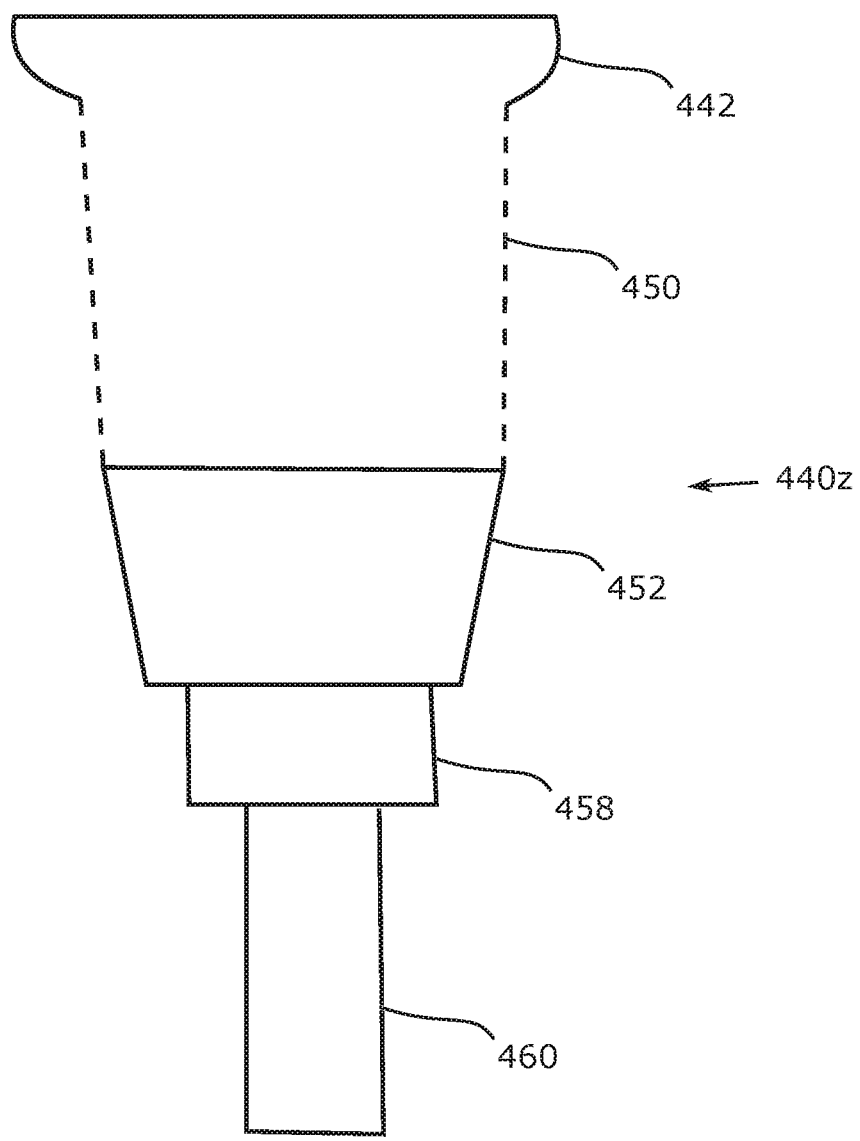
Fig. 4A1

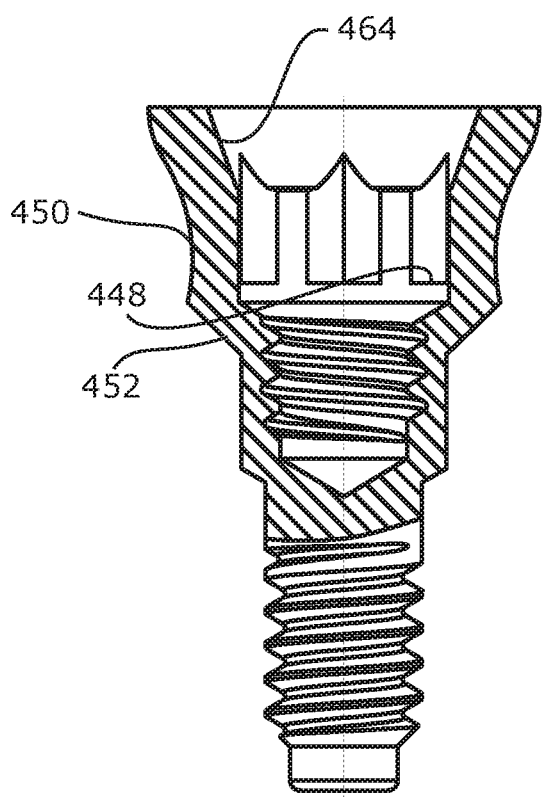
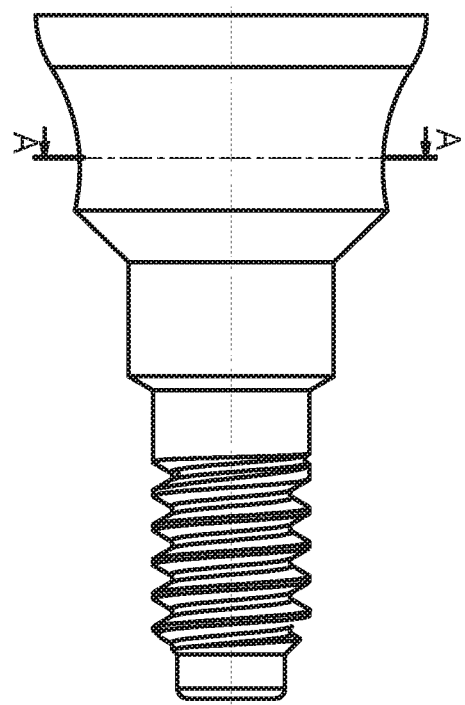
Fig. 4H1          Fig. 4H2
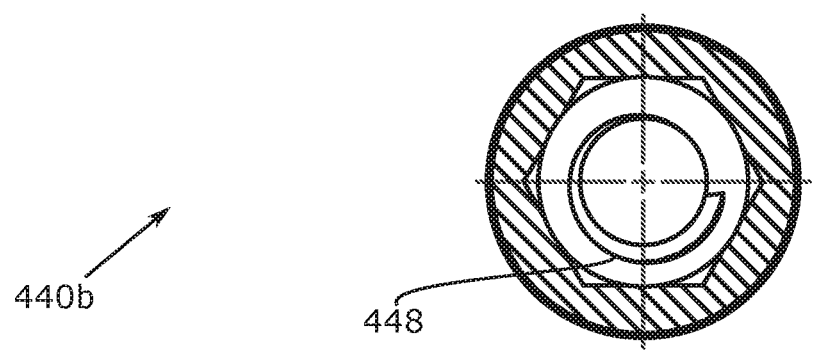
Fig. 4H3

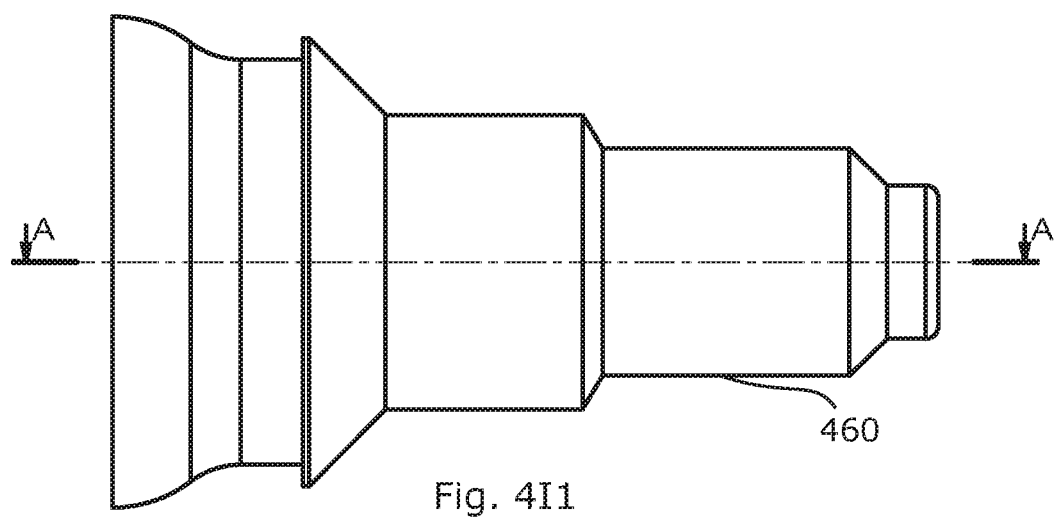
Fig. 4I1
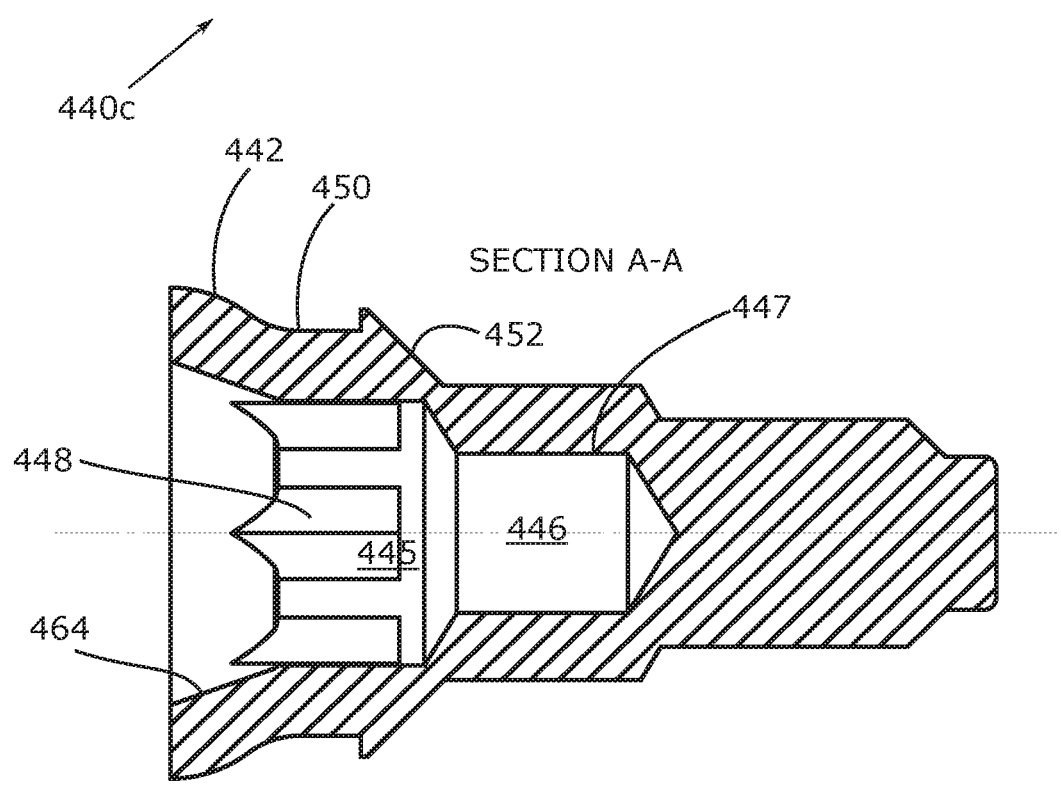
Fig. 4I2

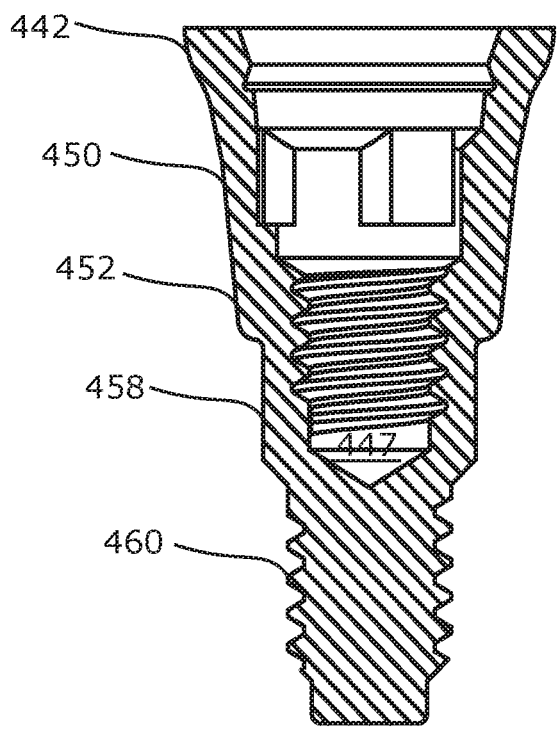
Fig. 4J1
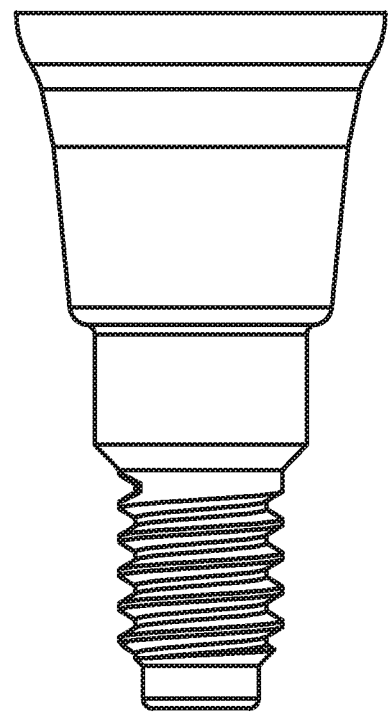
Fig. 4J2
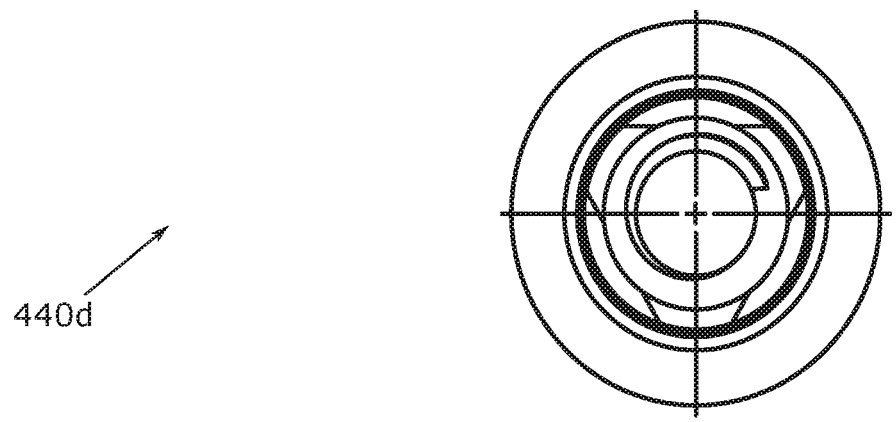
Fig. 4J3

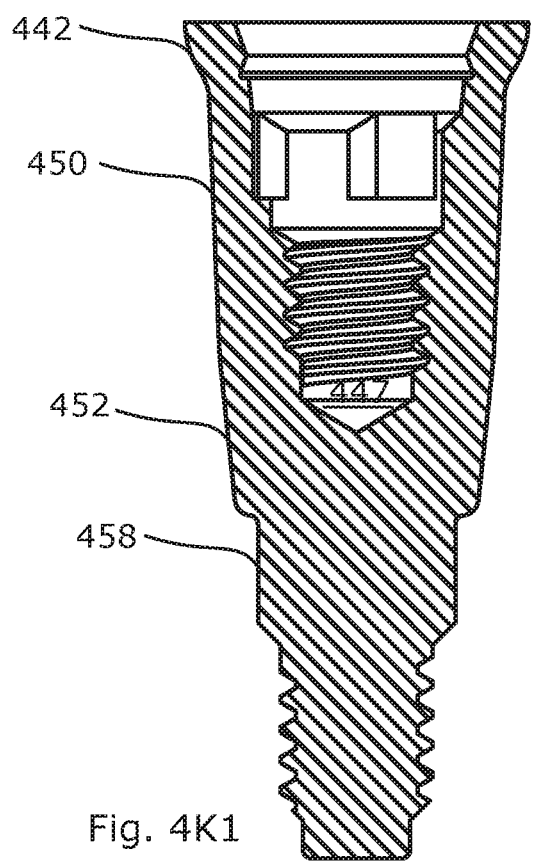
Fig. 4K1
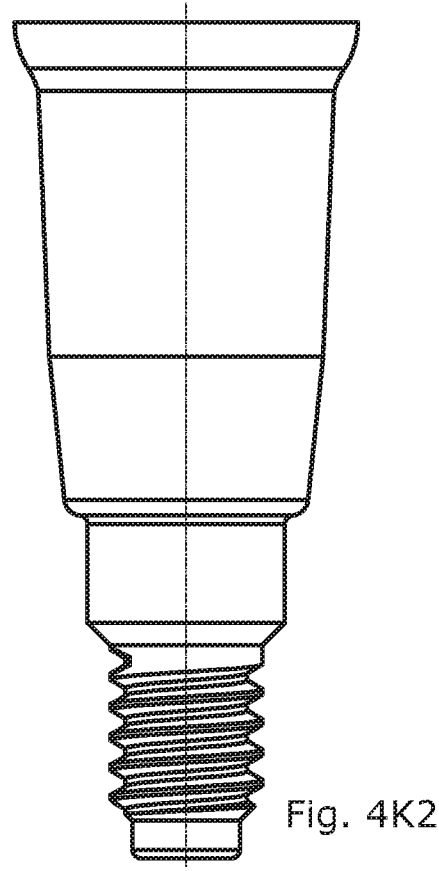
Fig. 4K2
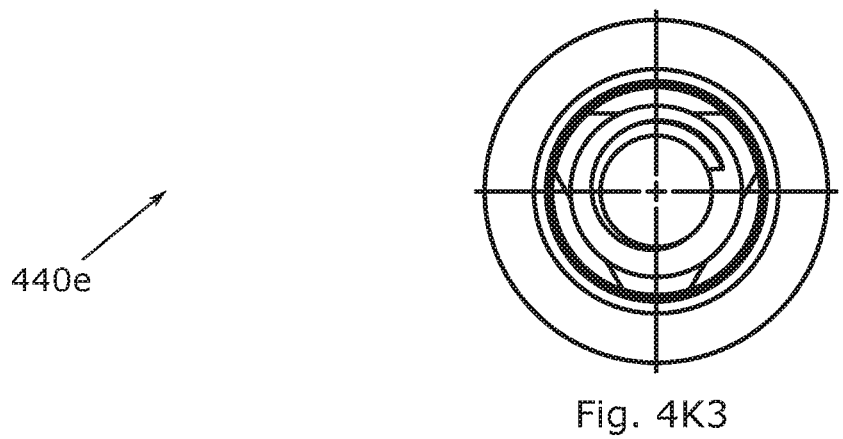
Fig. 4K3

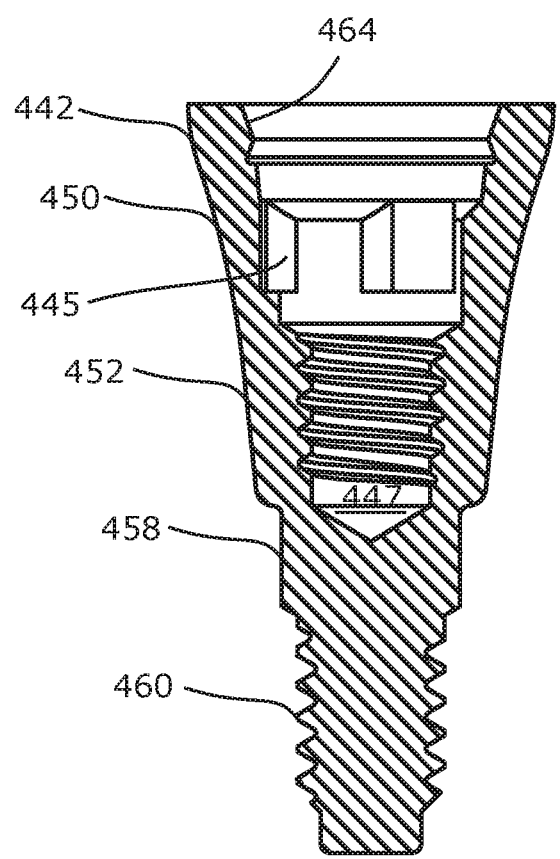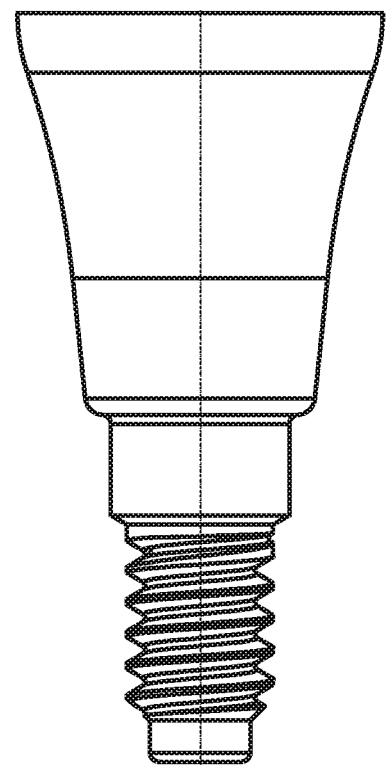
Fig. 4N2  Fig. 4N1
440g

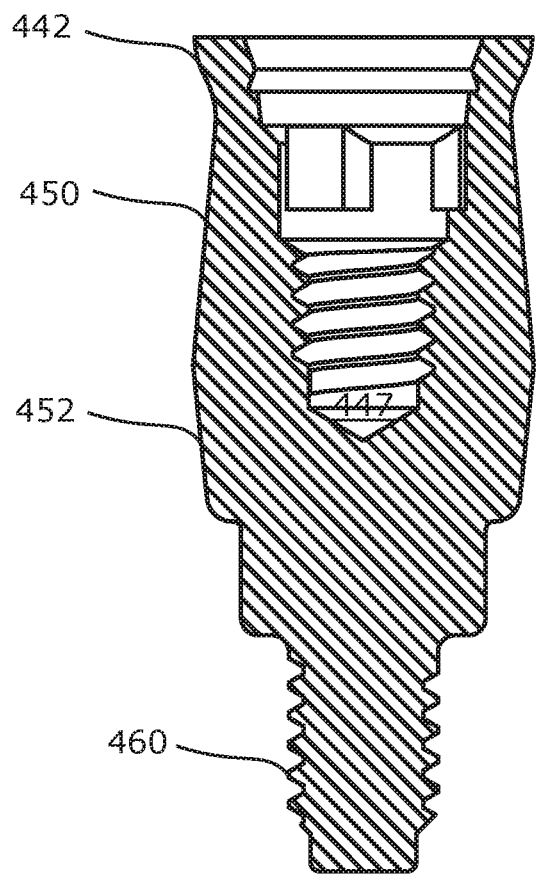
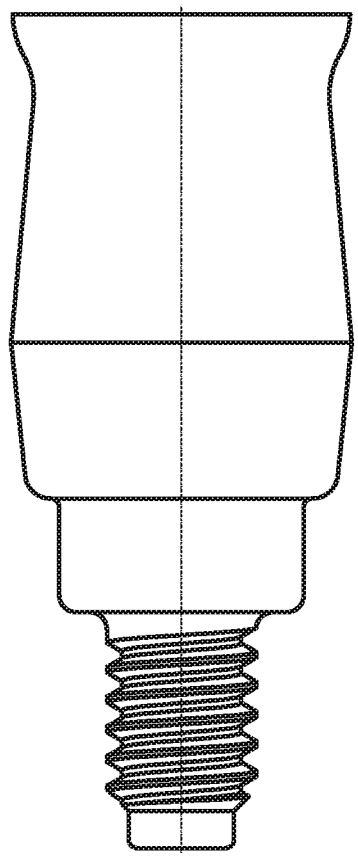
Fig. 4O1   Fig. 4O2
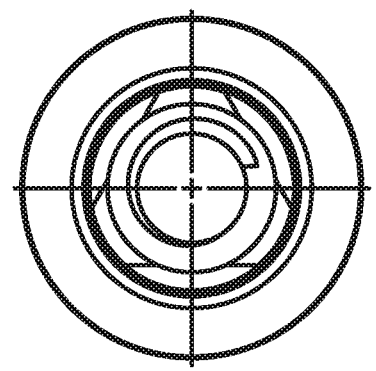
Fig. 4O3

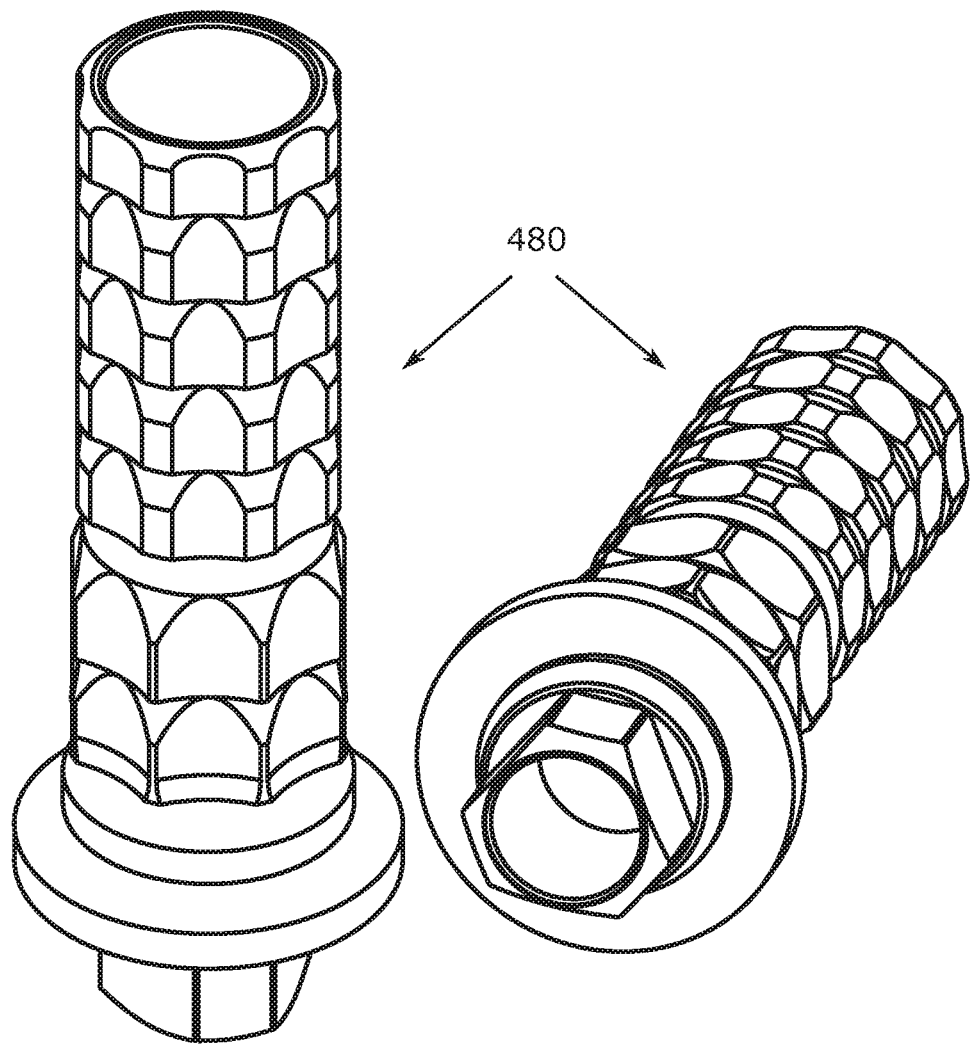
Fig. 4P1  Fig. 4P2

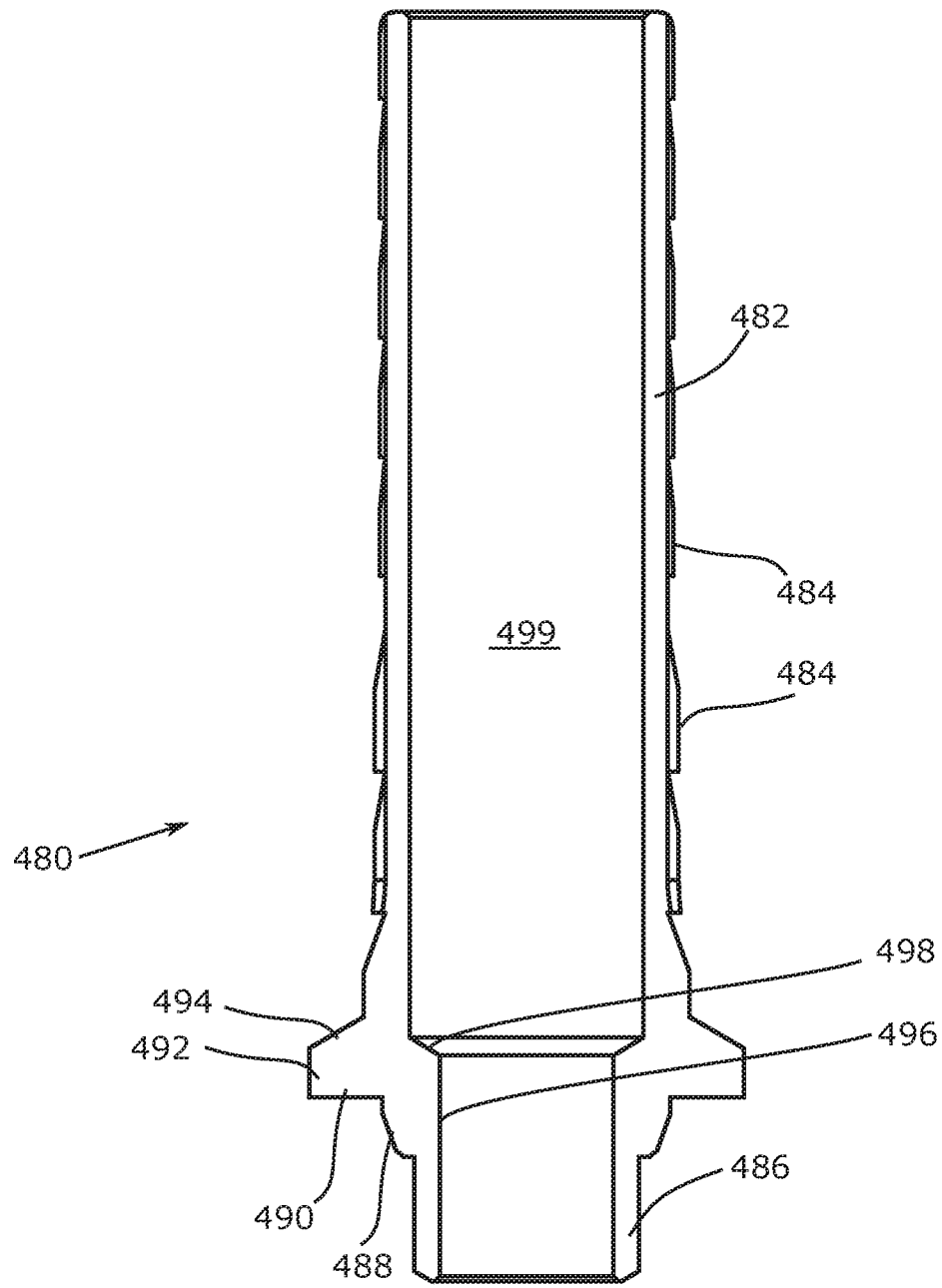
Fig. 4P3

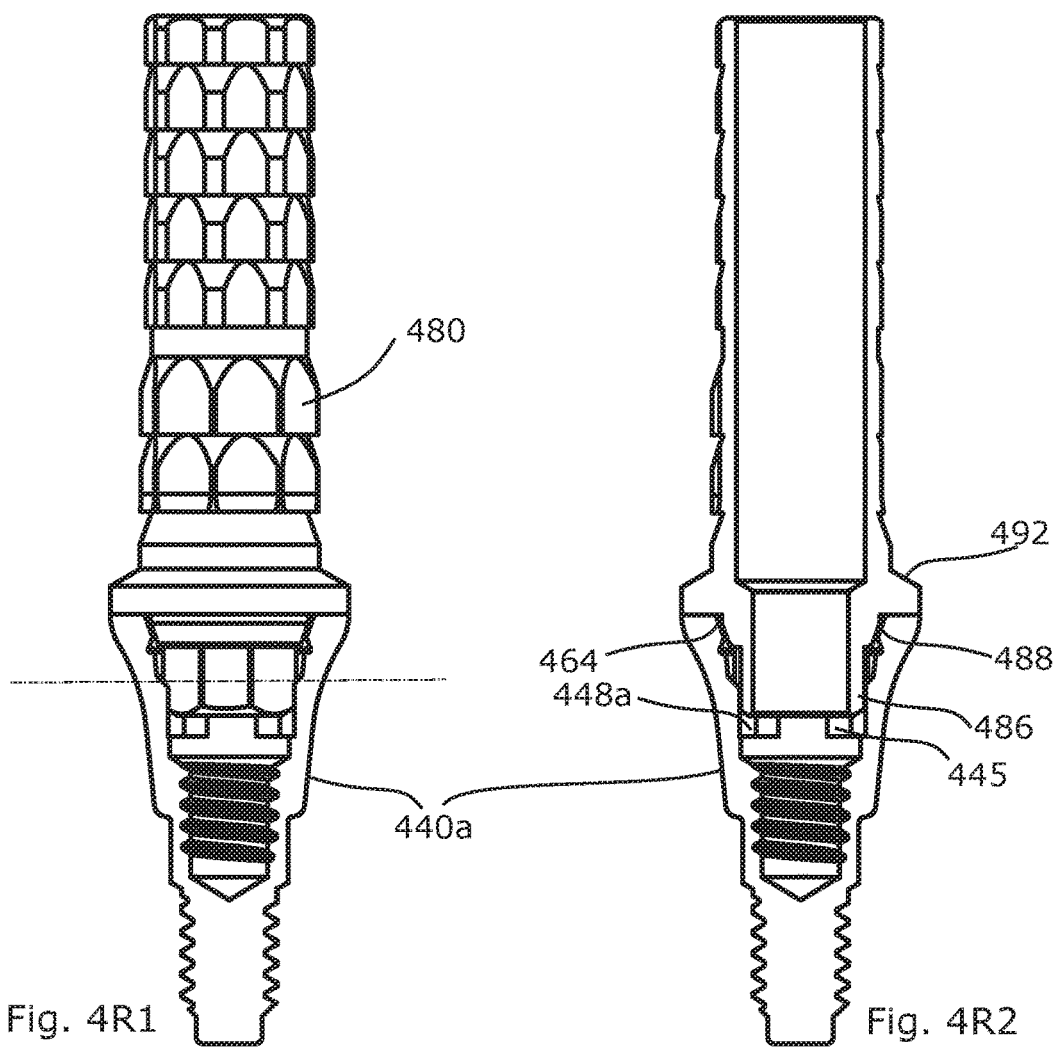
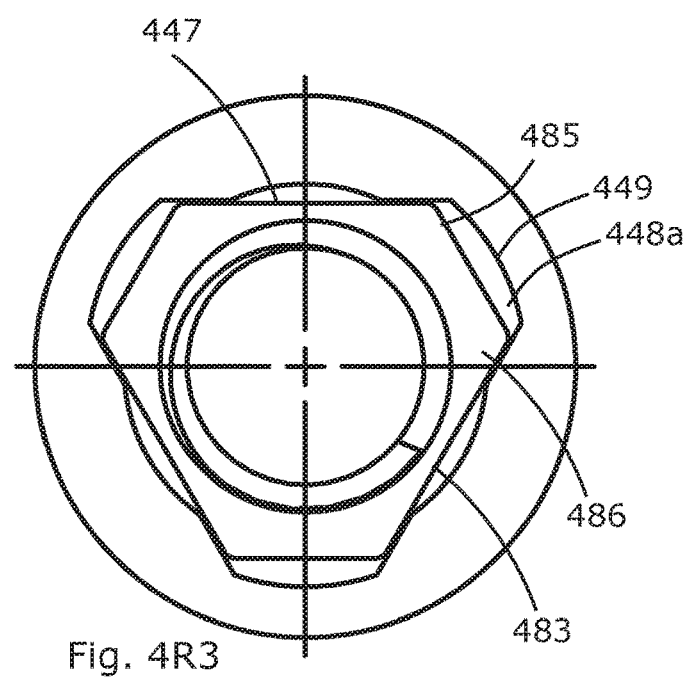

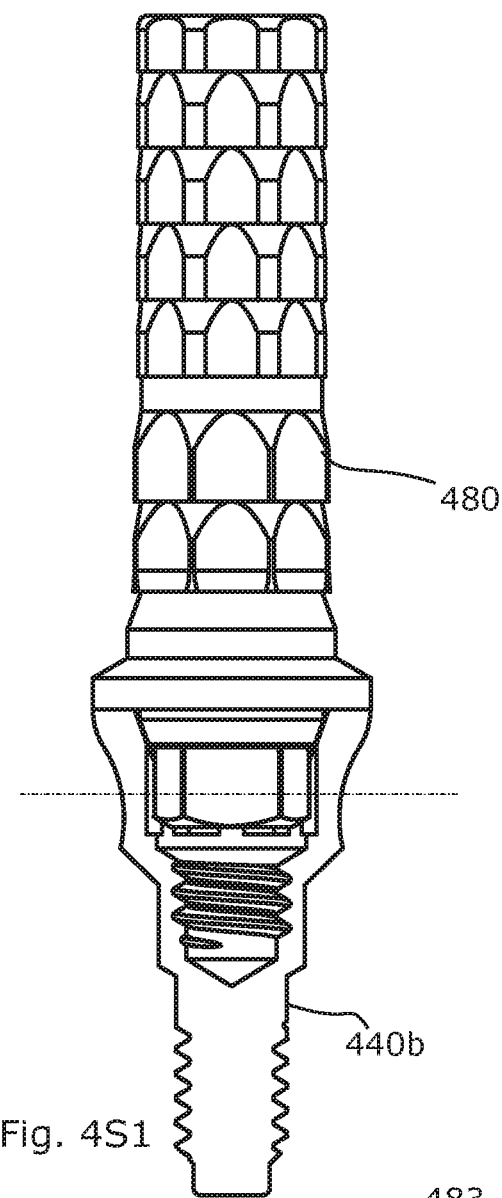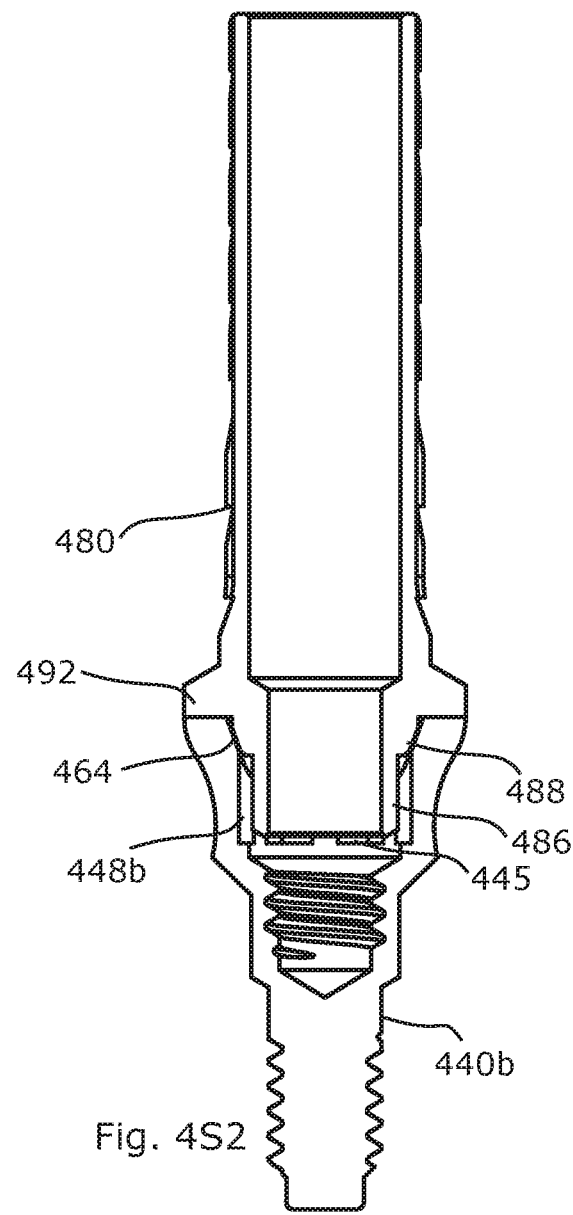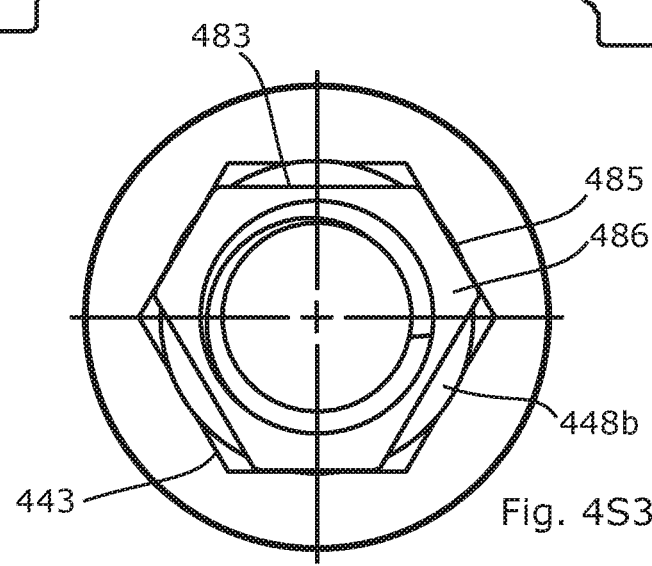
Fig. 4S1
Fig. 4S2
Fig. 4S3

DENTAL CONNECTION SYSTEM

RELATED APPLICATION

This application claims the benefit of priority under 35 USC 119(e) of U.S. Provisional Patent Application No. 62/512,119 filed on May 29, 2017, the contents of which are incorporated herein by reference in their entirety.

FIELD AND BACKGROUND OF THE INVENTION

The present invention, in some embodiments thereof, relates to a dental multi-part superstructure system and, more particularly, but not exclusively, to a base or a base and implant for use in or with such a system, for example, for use in adult-sized humans.

Dental multi-unit implant systems are known in the art for use as anchoring members for dental prosthetics. A multi-unit system (herein abbreviating "dental multi-unit implant system" or "dental multi-unit system") may include a dental implant, having a threaded portion typically threaded into a bore, which is drilled into the patient's mandible or maxilla; and a multi-part abutment system that itself may include a base for mounting on the implant, a superstructure mounted on the base and a restoration mounted on the superstructure. A separate screw for fixing the superstructure to the base in the implant is provided as well. A specific multi-unit system and the multi-part superstructure system that is part of the multi-unit system, may be composed so as to adapt to a specific patient, using parts selected from a respective series to optimally fit to the patient's anatomy and other specifics of the dental procedure that is carried out.

US patent application publication number 2009/0298013 discloses an abutment assembly device comprising a superstructure for supporting a dental prosthesis.

FIG. 1 schematically depicts an implant 20 and a base 30 of the prior art. Base 30 includes a protruding flange 36 in a form of a cone-section, configured to receive a prosthesis or a superstructure thereon, and a threaded bore 38 extending in the cone section. A superstructure or a prosthesis (not shown) configured to attach over the superstructure may include a frusto-conical or tapered cavity for receiving cone portion 36 of base 30 therein, such that the superstructure closely mates with the cone portion 36.

Additional background art includes U.S. Pat. Nos. 5,344,457, 5,829,977, 6,030,219, U.S. Patent Application Publication No. 2006/0183078 and U.S. Patent Application Publication No. 2014/0011160.

SUMMARY OF THE INVENTION

Some embodiments of the invention are illustrated by the examples below, noting that features shown in one example can be combined with features shown in another example, unless technically prohibited.

Example 1

A base for securing to a superstructure to a dental bone implant, said base comprising:
a top representing a widest portion of the base;
a lower tip of the base;
an external wall extending downward from the top;
an inner surface of the external wall extending downward from the top so as to define a cavity inside said base, the inner surface having an internally threaded portion; and
a lower external wall lower than the external wall and including an externally threaded portion configured to mate with a bone implant,
a bottom of the cavity extending more than 40% of a distance from the top to an uppermost part of the externally threaded portion as measured along a height of the base.

Example 2

The base of example 1, wherein most of the internally threaded portion is below a height of the inner surface that corresponds to a height of the top of the implant.

Example 3

The base of any of examples 1-2, wherein at least part of the internally threaded portion extends below one-quarter of a height from the top to the lower tip.

Example 4

The base of any of examples 1-3, wherein the height of the bottom of the cavity is adjacent the height of the uppermost portion of the externally threaded portion.

Example 5

The base of any of examples 1-4, comprising an intermediate external wall, intermediate between said external wall and said lower external wall, which is inwardly tapered to match a wall of a cavity in said implant.

Example 6

The base of any of examples 1-5, wherein the threading of the internally threaded portion and the threading of the externally threaded portion can both match a same screw geometry.

Example 7

The base of any of examples 1-6, wherein the inner surface of the external wall is inward-tapering such that at least a top of the cavity is inward-tapering.

Example 8

The base of any of examples 1-7, wherein the inner surface of the external wall has a non-circular anti-rotation configuration shaped to receive a bottom portion of a superstructure.

Example 9

The base of any of examples 1-8, wherein said cavity includes an unthreaded portion at least 20% by length of said cavity and greater in diameter than that of a threaded portion thereof, thereby defining a superstructure receiving cavity section such that an extension of said superstructure through which an attachment screw, that fits such threading, passes can fit therein.

Example 10

The base of example 9, wherein said superstructure receiving cavity section is at least 30% by length of said cavity.

Example 11

The base of example 9, wherein said superstructure receiving cavity section is between 40% and 60% by length of said cavity.

Example 12

The base of any of examples 9-11, wherein said superstructure receiving cavity section has a length of at least 2 mm.

Example 13

The base of any of examples 9-12, wherein a ratio of a length said superstructure holding section to an outer diameter d of the top is at least 1:2.

Example 14

The base of example 13, wherein said ratio is at least 3:4.

Example 15

The base of any of examples 1-9, wherein the wide top is a widest part of the base and the wide top is not more than 4 mm.

Example 16

The base of any of examples 1-15, wherein the external wall extends downward from the top to at least 7 mm in depth.

Example 17

The base of any of examples 1-16, wherein the cavity has a depth of at least 5 mm.

Example 18

The base of any of examples 1-17, wherein the external wall has a thickness of about 0.5 mm over at least 50% of an extra-implant portion thereof and a thicker portion at a portion adjacent where the base is designed to exit from an implant.

Example 19

The base of any of examples 1-17, wherein the external wall has a minimum thickness of at most 2 mm.

Example 20

The base of any of examples 1-19, wherein a height of the external wall exceeds an outer diameter d of the top.

Example 21

The base of any of examples 1-20, wherein an outer diameter of the top of the base does not exceed 4.5 mm.

Example 22

The base of any of examples 1-21, wherein an outer diameter of the top of the base does not exceed 3.5 mm.

Example 23

The base of any of examples 1-22, wherein the internally threaded portion is at least 1.5 mm long.

Example 24

The base of any of examples 1-23, wherein the inner surface of the external wall has a peripheral channel defined therein.

Example 25

A combination of the base of any of examples 1-24 with a superstructure, wherein the superstructure and comprising a screw that screws into the internally threaded portion, wherein the screw is at least 5 mm long.

Example 26

The base of any of examples 1-25, wherein the external wall narrows between an uppermost portion of the external wall and a lowermost portion of the external wall.

Example 27

An abutment system comprising a base according to any of the preceding examples and a superstructure having an extension sized to fit into said cavity in said base.

Example 28

A system according to example 27, wherein said extension is at least 20% by length of said superstructure.

Example 29

A system according to example 27, wherein said extension is at least 10% by length of said superstructure.

Example 30

A system according to any of examples 27-29, wherein said extension includes an anti-rotation geometry configured to interlock with both hexagonal and a non-hexagonal indexing of a cavity of said base.

Example 31

An implant system, comprising:
an implant having an internal implant wall that includes an internally threaded implant wall portion;
a base comprising:
a top;
an external wall of the base extending downward from the top and including an externally threaded portion configured to mate with the internally threaded implant wall portion;
an inner surface of the external wall extending downward from the top so as to define a cavity inside the base, the inner surface having an internally threaded portion,
at least part of the internally threaded portion is below a height of the inner surface that corresponds to a top height of the implant.

Example 32

The implant system of example 31, wherein a bottom of the cavity extends more than half a distance from the top to an uppermost part of the externally threaded portion as measured along a height of the base.

Example 33

The implant system of any of examples 31-32, wherein most of the internally threaded portion is below the height of the inner surface corresponding to the height of the top.

Example 34

The implant system of any one of examples 31-33, wherein a lowest inclined section of the external wall of the base matches a lower portion of the internal implant wall of the implant.

Example 35

The implant system of any of examples 31-34, wherein the base is narrower than the implant at a height just above the implant.

Example 36

The implant system of any of examples 31-35, comprising a superstructure and wherein said cavity in said base includes a section sized and shaped to receive an extension of said superstructure.

Example 37

A method of using a base as a bone level implant to minimize peri-implantitis, comprising:
(a) providing patient with an implant inserted below bone level;
(b) attaching a base to the implant, such that at least part of an external surface of the base is below bone level and wherein said base is smaller in cross-section in an external aspect thereof than said implant; and
(c) removing the base from the bone after peri-implantitis is suspected.

Example 38

The method of example 37, further comprising replacing the base with a second base.

Example 39

A method of using a base and to secure a superstructure, comprising:
inserting an implant into a bone, the implant having an internal implant wall that includes an internally threaded implant wall portion and an external implant threading;
inserting a base into the implant, said base including a cavity with an internally threaded section for receiving a screw; and
inserting a screw through a superstructure and into the base,
wherein the cavity is deep enough such that at least part of the screw inside the base is surrounded and supported by the base and part of the implant surrounding the base.

Example 40

A method of using a base and to secure a superstructure, comprising:
inserting an implant into a bone, the implant having an internal implant wall that includes an internally threaded implant wall portion and an external implant threading;
inserting a base into the implant, said base including a cavity; and
inserting a superstructure into said cavity;
wherein the cavity is deep enough such that at least part of the superstructure is at least 1 mm below a top of said base and/or at most 1 mm above a top of said implant.

Example 41

A superstructure sized and shaped for a dental implant system, comprising:
a body having a first diameter and adapted for mounting a dental restoration thereon; and
an extension below said body and having a diameter smaller than said body,
wherein said extension extends at least 5% of a length of said body.

Example 42

A superstructure according to example 41, wherein said extension extends at least 20% of a length of said body.

Example 43

A superstructure according to example 41 or example 42, comprising a flange extending radially away from said body.

Example 44

A superstructure according to any of examples 41-43, wherein said extension tapers inwards when extending away form said body, for at least a first distance.

Example 45

A superstructure according to any of examples 41-44, wherein said extension is generally cylindrical.

Example 46

A superstructure according to any of examples 41-45, wherein said extension defines screw receiving channel therealong therewithin.

Example 47

A superstructure according to any of examples 41-46, wherein said extension defines an anti-rotation geometry.

Example 48

A superstructure according to example 47, wherein said anti-rotation geometry matches both equal-sided hexagonal and a nonequal sided-hexagonal indexing.

Example 49

A superstructure according to example 48, wherein said anti-rotation geometry comprises a hexagonal cross-section with equal internal angles and with three long sides alternating with three shorter sides.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4A1 is a schematic side view of a base, in accordance with some embodiments of the invention;

FIGS. 4H1, 4H2 and 4H3 show various views of a base, in accordance with some embodiments of the invention;

FIGS. 4I1-4I2 show various views of a base, in accordance with some embodiments of the invention;

FIGS. 4J1, 4J2 and 4J3 show a side, a cross-sectional and a detail view of a base, in accordance with some embodiments of the invention;

FIGS. 4K1, 4K2 and 4K3 show a side and a cross-sectional view of a base, in accordance with some embodiments of the invention;

FIGS. 4L1, 4L2 and FIG. 4M show a side and a cross-sectional view of a base, in accordance with some embodiments of the invention;

FIGS. 4N1-4N2 show a side and a cross-sectional view of a base, in accordance with some embodiments of the invention;

FIGS. 4O1, 4O2 and 4O3 show various views of a base, in accordance with some embodiments of the invention;

FIGS. 4P1, 4P2 and 4P3 show various views of a superstructure attachable to a base, in accordance with some embodiments of the invention;

FIGS. 4R1, 4R2 and 4R3 show various views of an assembled abutment system, in accordance with some embodiments of the invention;

FIGS. 4S1, 4S2 and 4S3 show various views of an assembled abutment system, in accordance with some embodiments of the invention;

DESCRIPTION OF SPECIFIC EMBODIMENTS OF THE INVENTION

Figure 1:
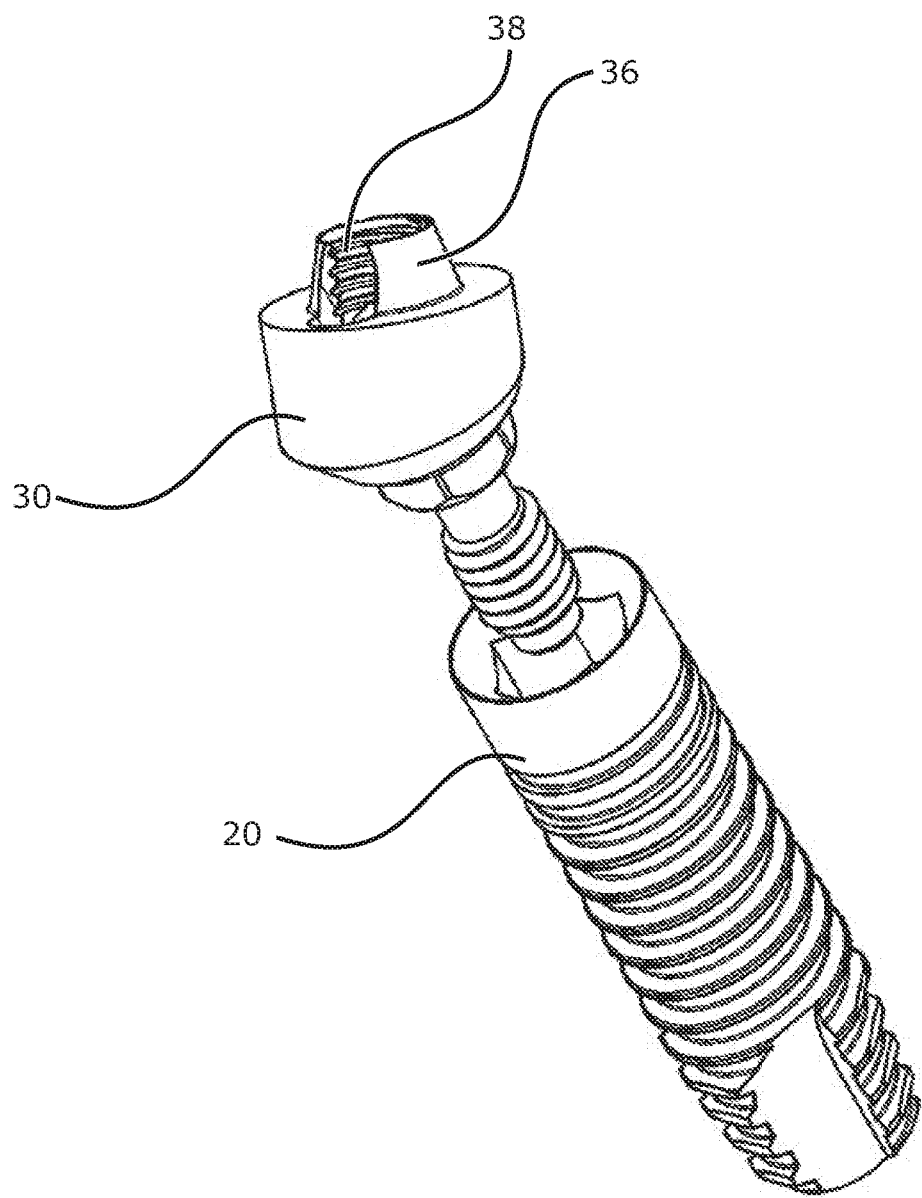
FIG. 1 is a schematic view of a dental implant and a superstructure of the prior art.

The present invention, in some embodiments thereof, relates to a dental multi-part superstructure system and, more particularly, but not exclusively, to a base or a base and implant for use in or with such a system.

Some embodiments of the invention generally provide a base that fits into a dental implant (typically having a threaded portion) and which is implanted into the patient's mandible or maxilla bones. The base is part of a multi-part abutment system that also includes the superstructure and a restoration. The base is secured to the implant and a superstructure is mounted thereon. A restoration may be mounted on the superstructure or be separately attached. Optionally, a screw is used to fix the superstructure to the base.

An aspect of some embodiments of the invention relates to a base with an internal cavity for receiving a screw and/or an extension of the superstructure, and in which the cavity is deep enough that the screw lies at least partly below the top of the implant. Optionally, this allows the screw to be radially supported by the implant as well as the base. Optionally or alternatively, this allows the base to be narrower, which may have an esthetic advantage. As used herein, top is the direction away from the bone.

In some exemplary embodiments of the invention, the cavity includes an inner threading for a screw attachment. Optionally, the threading is below a widest portion of the base. Optionally, at least 50%, 70%, 90% or intermediate or smaller percentages of the inner threading are designed to be below a top of the implant. Optionally, the widest part is selected as the widest part within 1 mm from the top.

It is a particular feature of some embodiments of the invention that the length of the internal cavity allows a smaller diameter base to be used. In some cases, a reduction in diameter is due to a thinner wall being used. In some embodiments a reduction in diameter is due, at least in part, to support by the implant and not only by the base. In some exemplary embodiments of the invention, smaller diameter is due, at least in part, to support of the superstructure being axial (e.g., along a length) rather than mainly lateral (by the cross-sectional size of the top of the base). Possibly, the implant itself supports part of the non-axial forces applied by the restoration (e.g., via the screw). Another possibility is that the length of the cavity provides more support and therefore divides up the stresses on the base wall along a greater area, possibly allowing the walls to be weaker.

In some exemplary embodiments of the invention, lateral support is reduced by providing an implant with a small top diameter and/or reducing an amount of contact at a top face.

It is a particular feature of some embodiments of the invention that a long internal cavity is abetted by using a built in portion with external threading rather than a separate screw. In some exemplary embodiments of the invention, the cavity is long enough to provide support to the superstructure. Optionally or alternatively, the cavity is long enough so that it lies within the implant level and the implant can support the base.

In some exemplary embodiments of the invention, the cavity is made narrow so that the base is narrow. Optionally, the cavity is shaped to receive a portion of the superstructure which is within 1 mm in outer diameter and/or 10% in diameter of the screw used to attach the superstructure to the base. In some exemplary embodiments of the invention, there is no part of the base or other pre-formed mechanical structure between the screw and the superstructure portion inserted into the base.

In some exemplary embodiments of the invention, the parts of the superstructure inserted into the base all, or at least 50% by length, lie above the attachment point of the screw which couples the superstructure to the base.

It is a particular feature of some embodiments of the invention that the base is in the form of a single unit (e.g., integrally cast and/or machined and/or otherwise formed, with no connectors) including both superstructure support and connection to the implant. Optionally, this increases stability and/or allows a thinner profile base to be used.

As noted, a narrower base may be more esthetic. In some exemplary embodiments of the invention, the base width is less than that of the implant, or within 20% thereon. In some embodiments, the widest part of the base is substantially the same as the width of the implant. In some exemplary embodiments of the invention, the top of the base serves to support a superstructure mounted thereon.

In some exemplary embodiments of the invention, the top of the base is wider to allow it to have an internal taper (and optionally an external taper to match, due to wall thickness), which taper may be used to allow insertion of screws and/or superstructures at an angle to the axis. In some exemplary embodiments of the invention, this taper is reduced or eliminated. For example, for single implant situations, where a different implant does not constrain orientation, insertion may be directly axial and obviate need for taper.

In some exemplary embodiments of the invention, for a single implant, a wall thickness may be reduced as there may be reduced bending moments. Optionally, the reduction is to up to 0.45 or 0.4 mm thickness.

In some exemplary embodiments of the invention, for single or non-single implantations wall thickness may be increased, for example, by 10%, 15%, 20%, 30%, 40% or intermediate or smaller or larger percentages (e.g., relative to an average wall thickness of parts that are not the base top), in an area above where the base exits the implant. This is the area where largest bending moments may be experienced, in some designs.

Optionally or alternatively, the material near the top of the base is treated or formed of a material which is elastic enough to allow such off-axis insertion. In some exemplary embodiments of the invention the tapering, if provided, is between 0-15, 15-30 or 30-45 degrees or intermediate angles. Optionally, a taper below 15 degrees is used, if off-axis insertion is not desired. Optionally, a larger taper is avoided in order to maintain a smaller diameter of the base top (e.g., for esthetic reasons).

It is a particular feature of some embodiments of the invention that the base includes a superstructure receiving cavity. Optionally, this cavity extends past the internal tapering. Optionally, this cavity is part of the screw receiving cavity of the base. In some exemplary embodiments of the invention, the cavity is deep enough so that at least 10%, 15%, 20% or intermediate or greater percentages by length of the superstructure are within the base. Optionally or alternatively, the part within the connect has a length which is at least 50%, 75%, 100%, 150%, 200% or intermediate percentages of the width of the super structure body (e.g., average width of the top 50% of the superstructure). Optionally, the inserted portion reaches down to the level of the implant, for example, 1 mm or more below it, or is near thereto, for example, within 1 or 2 mm from a top of the implant.

While some embodiments of the invention have a generally monotonic and optionally uniform external tapering on the parts of the base designed to be outside the implant, this is not provided in all embodiments. For example, the tapering may include one or more changes in tapering direction (e.g., defining a bulge and/or a recess) and/or may include one or more non-tapering sections.

In some exemplary embodiments of the invention, the top of the base has a diameter of between 3 and 5 mm, for example, about 3, between 3 and 4 or about 4 mm. It is noted that the top of the base is optionally designed to be at the gingival level, where it may be noticeable, so smaller is generally better. Optionally, the top of the base is the widest portion thereof. It is noted, that in some exemplary embodiments of the invention, the internal threading of the base is all below the widest portion thereof, unless such widest portion is designed to lie within 1 mm of the implant. Optionally, due to the external taping of some embodiments, there is a shoulder where the base meets the implant such that the implant is wider at its top than the base at the level right above. A potential advantage is that some mechanical disturbances between the implant and the base occur away from the bone tissue, reducing the probability for bone resorption. Optionally, the base does not axially abut the top surface of the implant. Alternatively, an abutting surface may be provided, for example for sealing. Optionally or alternatively, a support surface (e.g., having a radial extent of more than 0.1 mm), is provided. In some embodiment, an inclined surface is provided, having a length of, for example, between 0.1 and 3 mm. Optionally, this surface engages the implant by friction and is used to prevent rotation of the superstructure relative to the implant.

In some exemplary embodiments of the invention, the outer surface of the base, in regions designed to be below the top of the implant, are matched to the internal surface of the implant. This may help provide mechanical support by the implant to the base, screw and/or superstructure. In some exemplary embodiments of the invention, the cavity of implant and external surface of the base are tapered in a matching manner.

In some exemplary embodiments of the invention, the matching between the tapers is not perfect. For example, the base, at least in parts designed to be near the top of the implant is wider than the implant cavity, for example, by the tapering of the connecting being greater than that of the cavity. This may allow press-fitting, sealing and/or friction between the base and the implant, which may, for example, prevent bacterial infection, tissue ingrowth and/or back rotation. Optionally, elastic material or surface or volume treatment are provided at such places where sealing is desired. In some exemplary embodiments of the invention, the match between the tapering angles is between 0.1 and 5 degrees, for example, between 0.5 and 2 degrees, for example, about 1 degree (e.g., the base having a larger or a smaller taper).

In some exemplary embodiments of the invention, the base includes an external threading to match with an internal threading of an implant. In some exemplary embodiments of the invention, the internal threading of the base matches the internal threading of the implant with respect to one or more of width, thread shape, height and/or thread pitch. Optionally, this allows the same screws to be used for an implant and for the base. In some embodiments, a narrower screw is used for connecting the superstructure to the base, for example, a wide platform implant would have a wide platform base, but the superstructure would be connected with a narrow platform screw.

In some exemplary embodiments of the invention, the base includes an internal indexing (e.g., a hexagon), optionally formed in the internal cavity of the base, optionally within a tapering section there, which optionally matches the design of indexing provided in the implant. Optionally or alternatively, an additional or alternative indexing, for example, with a higher angular resolution is provided in the base, for example, near a top surface of the base. Alternatively, no indexing but rather an asymmetrical geometry to prevent rotation, is provided.

In some exemplary embodiments of the invention, the top of the base cavity includes an undercut or other interference design, optionally for snap connecting to a matching superstructure and/or tool (e.g., to prevent it falling off the tool during implantation or other manipulation by a user).

In some exemplary embodiments of the invention, the type of connection of the base matches that of the implant (e.g., hexagonal or conical), this may facilitate manipulation by the user.

In some exemplary embodiments of the invention, the base has an external wall extending downwards from a top of the base. Optionally, the external wall is narrow and long so that the base has a narrow diameter at its top and has a deep cavity that allows deep penetration of a screw or other part of the superstructure into the base. The external wall narrows in some embodiments as it moves downward toward a tip of the base. The narrowing optionally is as a result of being inwardly-tapering. The base optionally includes a lower (e.g., designed to be below the implant top) external wall lower than the external wall that includes the externally threaded portion configured to mate with the bone implant.

In some exemplary embodiments of the invention the base is compatible with either a conical connection or an internal hexagon connection. Optionally, the inner indexing of the base is identical to the inner indexing of the implant—to allow the same implant driver to attach to the implant and the base.

In some exemplary embodiments of the invention, an inner surface of the external wall that extends downward from the top so as to define the cavity inside said base has an internally threaded portion that extends deeply into the base and in some embodiments extends far enough to be adjacent in height to a height of an externally threaded portion of the base used to fit the base to the implant. The bottom of the cavity optionally extends more than half a distance from the top to an uppermost part of the externally threaded portion as measured along a height of the base. In some exemplary embodiments of the invention, the cavity extends to within 1 or 2 mm or even below a level of an externally threaded portion of the base.

In some exemplary embodiments of the invention, the superstructure and/or screw are placed well into the bone level and may be surrounded not only by the base but indirectly by the implant and/or bone.

In some exemplary embodiments of the invention, there is provided an implant system that includes the base and an implant having an internal implant wall that includes an internally threaded implant wall portion that mates with the externally threaded portion of the base. In some exemplary embodiments of the invention, the internally threaded portion of the base is sufficiently below the height of the inner surface corresponding to the height of the top that it is at a height of the implant in the bone. In some embodiments, a lowest inclined section of the external wall of the base matches and is designed to mate to and optionally seal to a wall of a cavity in the implant.

In some exemplary embodiments of the invention, the base is used for single tooth restoration. Optionally, this allows an even narrower top diameter for the base, as no or a smaller inner taper at an entrance is needed.

An aspect of some embodiments of the invention relates to locking a base to an implant. In some exemplary embodiments of the invention, the base has a rotationally symmetric bottom (other than threading).

In some exemplary embodiments of the invention, the base defines a conical section that matches (optionally with a slight mismatch) a tapering of a cavity in the implant.

In some exemplary embodiments of the invention, the matching is selected so that when the base is tightly screwed into the implant, friction between the base and the implant is sufficient to prevent rotation therebetween. Optionally, the tightening is between 15 and 40 Ncm.

An aspect of some embodiments of the invention relates to a base designed and used with a superstructure that can fit into it. Optionally, the base and superstructure are provided as a kit. In some exemplary embodiments of the invention, the base includes a body, a flange and an extension of the body below the flange. Optionally, the flange is supported by the top of the base, while the extension enters into the base. Optionally, the extension reaches down at least 15% of the length of the body. Optionally or alternatively, the extension is as long or longer than half the width of the body above the flange. In some exemplary embodiments of the invention, the extension includes a geometry that interlocks with the geometry of the base. Optionally, the geometry is configured to interlock with either a hexagonal or a triangular-type geometry of the base.

In some exemplary embodiments of the invention, the flange includes on a bottom portion thereof a geometry which interlocks with an indexing geometry of the base. Optionally, the extension does not have an interlocking geometry.

In some exemplary embodiments of the invention, the tapering is designed so that there is no undercut when removing the superstructure form the base, at an angle.

In some exemplary embodiments of the invention, for example for off-axis restoration, the extension is at most about as long as the tapered section, for example, between 2 and 10%, for example, about 5% of the length of the body. In some exemplary embodiments of the invention, such a shorter extension does not have indexing thereon. In some exemplary embodiments of the invention, the contact between the base and the superstructure provides enough friction to prevent relative rotation therebetween.

In some exemplary embodiments of the invention, the extension (inserted length) is between 0.5 and 7 mm, for example, between 1 and 5 mm, for example, about 2 mm in length.

An aspect of some embodiments of the invention relates to a superstructure having a lower "male" extension compatible with both hexagonal and torx-type connectors. In some exemplary embodiments of the invention, the lower extension is six sided, with lengths and angles that fit within a hexagonal connection. However, only three of the six sides are of a length matching the hexagonal connection. Every alternating side is made shorter so that the extension also fits within a torx-like connection. In some exemplary embodiments of the invention, the angles are all the same.

In some exemplary embodiments of the invention, this provides three sides that rest against the walls of a (female) hexagonal connection and six sides that rest against a the walls of torx-like connection.

An aspect of some embodiments of the invention relates to peri-implantitis. In some exemplary embodiments of the invention, a base used to attach a restoration is also used at a bone level where peri-implantitis is expected. In some exemplary embodiments of the invention, the dental implant is implanted below bone level and the base is implanted to bone level or above. In some exemplary embodiments of the invention, the base has an internal cavity which reaches below the implant level so that the implant can radially support the reconstruction attached to the base.

In some embodiments of the invention, the base, which in some cases is roughly the width of the implant, optionally undergoes a bone osseo-integration treatment (e.g., as typically applied to an implant) and then the base is optionally implanted into the bone such that the top of the base sits on or just below an interface between the bone and a gingival tissue of the patient above the bone.

Later, if peri-implantitis is suspected, the base is optionally removed from the bone. The tissue may be treated and a new base inserted with the same restoration, and at the correct location.

In some exemplary embodiments of the invention, the base is narrower at its bottom-most exposed part than the implant. Optionally or alternatively, the base can also be used for attaching a superstructure thereon.

In some exemplary embodiments of the invention, the base has an entry taper. Optionally, this taper is between 1% and 20%, for example, between 3 and 7%, for example, about 5% of a length of the superstructure.

Before explaining at least one embodiment of the invention in detail, it is to be understood that the invention is not necessarily limited in its application to the details of construction and the arrangement of the components and/or methods set forth in the following description and/or illustrated in the drawings and/or the Examples, if any. The invention is capable of other embodiments or of being practiced or carried out in various ways.

Figure 3A:
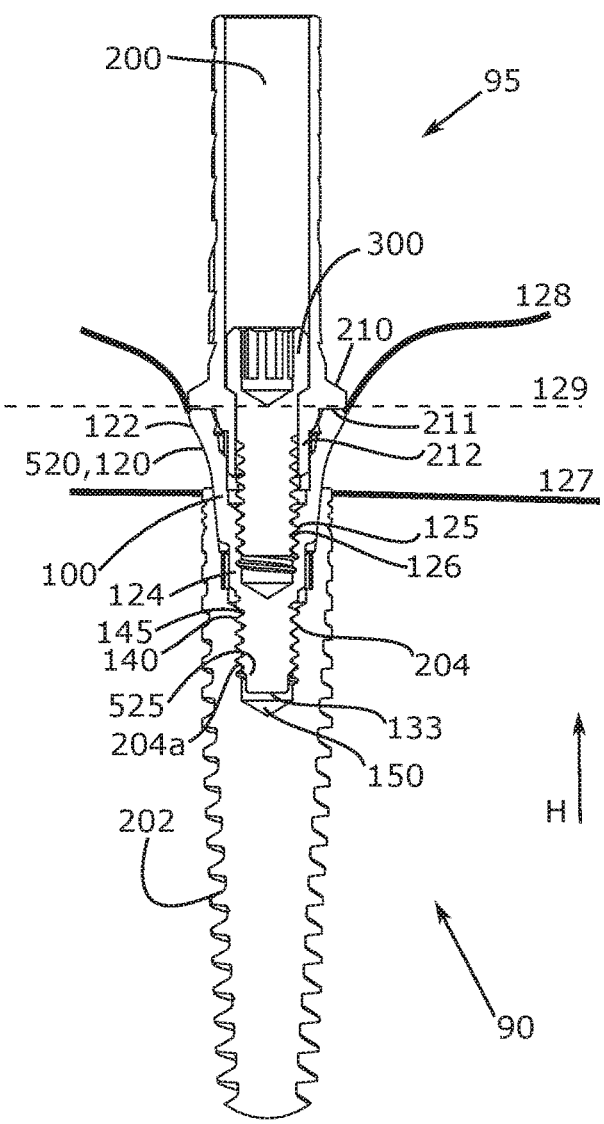
FIG. 3A is a vertical sectional view of a dental implant, base, superstructure and screw, in accordance with an exemplary embodiment of the invention.
Figure 3B:
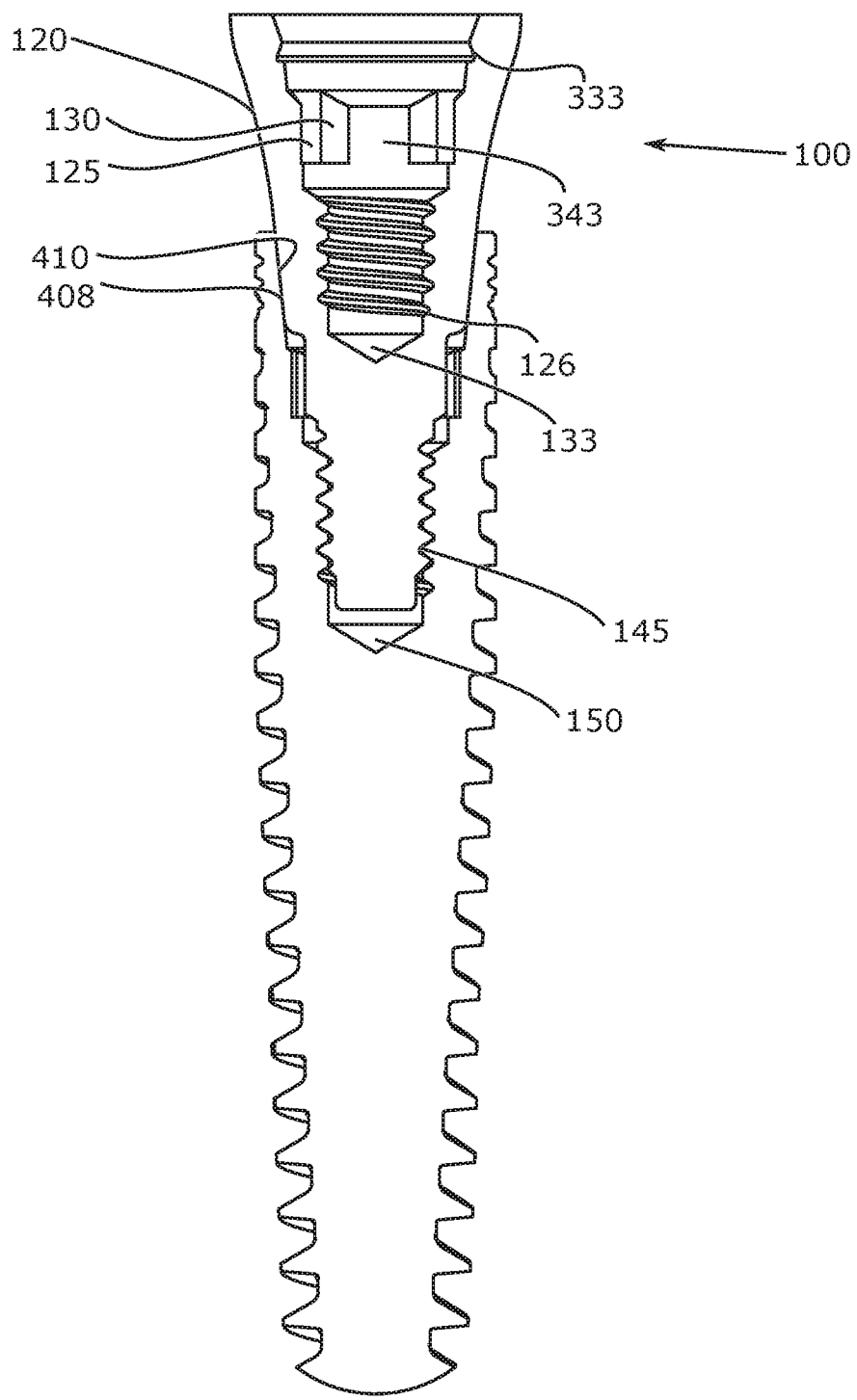
FIG. 3B is a partial sectional view of a base and implant, in accordance with some embodiments of the invention.

Referring now to FIG. 3A and FIG. 3B, a multi-part abutment system 95 is connected to an implant 202 which together are a multi-unit system 90. Base 100 of the multi-part superstructure system 95 is threadingly engaged to implant 202 in this embodiment. A screw 300 is also threadingly engaged to base 100 in this embodiment. FIG. 3A also shows a superstructure 200 interfacing with fitting inside base 100 and interfacing with (and coupled to base 100 by) screw 300. In some embodiments, adhesive or glue or a setting material is used instead of or in addition to a screw, and the internal threading in the base may be omitted or replaced by a glue holding structure, such as surface roughness. It is noted that both axial downward forces and bending forces are optionally carried by the base, so the glue is optionally used mainly to prevent axial retraction and/or fill in spaces between components to improve stability. Optionally, an anti-rotation geometry is used to prevent torsion forces as well.

Specifically, FIG. 3A shows base 100 as comprising a wide top 110 that optionally represents a widest portion of base 100 and that optionally engages the most external portion 211 of a base 210 of superstructure 200. As noted herein, even this "wide" top is not very wide (though it is optionally the widest part of base 100) and may serve a reduced stabilization function as compared to other parts of the base.

In some exemplary embodiments of the invention, the wide top is not more than 5 mm in maximal diameter, in other embodiments not more than 4 mm and in still other embodiments not more than 3 mm, thereby potentially permitting a relatively narrow restoration and/or less visibility of the base, for example, as discussed below. More inwardly situated portions 212 of base 210 of superstructure 200 optionally fit inside base 100, for example as shown in FIG. 3A, and in particular inside a cavity 130 of base 100.

FIG. 3A shows that the top 110 is optionally substantially flat but top 100 may have other shapes in other embodiments. In particular top 110 may be designed to mate and/or axially support base 210. For example, top 110 may include an annular ridge (or other protrusion and/or recess or set thereof) which matches an annular groove in the superstructure.

Base 100, e.g., as shown in FIG. 3A optionally includes a lower tip 150. Base 100 also includes an external wall 120 extending downward from the top 110. In FIGS. 3A and 3B, an inner surface 125 of the external wall 120 extends downward from the top 110 so as to define a cavity 130 (best seen in FIG. 3B) inside base 100. The inner surface 125 optionally has an internally threaded portion 126.

Base 100 optionally has a lower external wall 140 lower than the external wall 120 that optionally includes an externally threaded portion 145 optionally configured to mate with the bone implant 202. A bottom 133 of cavity 130 extends deeply into base 100 in the embodiment shown in FIG. 3A. Bottom 133 of cavity 130 in one option extends more than half a distance (and in other options extends more than ⅗ a distance, in still other options extends more than ⅔ a distance and in other options extends more than ¾ or in other options more than 9/10 of the distance and/or intermediate fractions thereof) from the top 110 of base 100 to an uppermost part 146 of externally threaded portion 145 as measured along a height of the base. The height axis is denoted in FIG. 3A as "H". Also to be noted are the thick line 127 denoting the top of the bone, thick line 128 denoting the top of the gingival and dashed line 129 indicating the level of the gingival at the implant site.

In some embodiments, such as shown in FIGS. 3A-3B, bottom 133 of cavity 130 extends such that the height of the bottom of the cavity 130 is adjacent (or in other embodiments within 0.5 mm or within 1 mm or within 1.5 mm or within 2 mm or within 2.5 mm of) the height of the uppermost portion of externally threaded portion 145.

Optionally, most of (or in other options one-quarter of, one-third of, two-thirds of or three-quarters of or intermediate factions of) the internally threaded portion 126 is below a height of the inner surface 125 that corresponds to the level of top 110.

In FIG. 3A, all of internally threaded portion 126 is below a height of the inner surface 125 that corresponds to the level of the top 110. In other embodiments, at least 20%, 40%, 60%, 70%, 90% or intermediate percentages are below. In some embodiments, internally threaded portion is at least 2 mm long. In other embodiments, internally threaded portion is at least 2.5 mm long or at least 3 mm long, at least 3 mm long, at least 3.5 mm long, at least 4 mm long or at least 4.5 mm long. In some exemplary embodiments of the invention, the threading includes between 3 and 5 threads, for example, 4 with steps of, for example, between 0.2 and 0.43 mm, for example, about 0.35 mm.

In some exemplary embodiments of the invention, the above noted more inwards portions of base 212 fit between 0.2 and 4 mm below top 110, for example, between 1 and 3 mm, for example between 1.7 and 3 mm.

As shown for example in FIG. 3A, in one option, the external wall 120 narrows between an uppermost portion 122 of the external wall 120 and a lowermost portion 124 of the external wall 120. For example, the external wall 120 narrows gradually by being inwardly-tapering in at least a section of external wall 120. In some options, external wall 120 is inward-tapering with no portion not being inward-tapering. In one particular option, at least part of external wall 120 narrows step-wise as one moves in a direction from the top 110 toward the tip 150.

Optionally, at least part of the internally threaded portion 126 extends below one-quarter (in other options below at least one-third or below at least two-thirds or intermediate fractions) of a height from the top 110 to the lower tip 150. In FIG. 3A, for example, at least part of the internally threaded portion 126 extends below one-half of a height from the top to the lower tip.

The inner surface 125 of the external wall 120 narrows in some embodiments such that at least a top of the cavity 130 narrows. Optionally, cavity 130 narrows by being inward-tapering. In some embodiments, cavity 130 and inner surface 125 are inwardly-tapering from the top 110 to at least a quarter (or at least a third, or in other embodiments to a least one half) of a height of the cavity 130.

As seen, for example, in FIG. 3A, in some embodiments, the external wall 120 extends downward from the top 110 to, for example, at least 2 mm in depth, and in other embodiments to at least 3 mms or to at least 4 mm or to at least 5 mm or 6 mm in depth or intermediate depths. In some embodiments, external wall 120 extends downward between 2 mm and 5 mm, or in other options between 3 mm and 5 mm or between 2 mm and 4 mm, or between 2 mm and 6 mm and/or smaller or greater values.

In some exemplary embodiments of the invention, the external wall is between 0.2 and 0.9 mm thick, for example, about 0.5 mm thick. In some exemplary embodiments of the invention, the wall thickness is the minimal thickness which provides a required mechanical strength and/or stability.

Optionally, external wall 120 has a maximum thickness that does not exceed 1 mm (or in other embodiments does not exceed 0.2 mm or 0.3 mm or 0.4 mm or 0.5 mm or 0.7 mm or 0.8 mm or 0.9 mm or intermediate or greater values). This minimization of the thickness of external wall 120 can allow the diameter, d, at top 110 to be smaller than otherwise, which may reduce the visibility of base. For example, in one embodiment, an outer diameter d of the top 110 of base 100 does not exceed 4 mm, in other embodiments outer diameter d at top 110 does not exceed 3.5 mm and in still other embodiments outer diameter d does not exceed 3 mm.

Optionally, a ratio of a height of external wall 120 to a (maximal) outer diameter d of the top 110 is at least 1:2. In other embodiments, this ratio is at least 3:4. In still other embodiments, this ratio is such that a height of the external wall 120 exceeds an outer diameter d of the top.

In some exemplary embodiments of the invention, a ratio between the depth of cavity 130 and a depth of a superstructure receiving portion thereof is between 1.1:1 and 4:1, for example, between 1.5:1 and 2:1.

In some embodiments, the threading of the internally threaded portion 126 and the threading of the externally threaded portion 145 are of the same pitch, angle and shape. This allows the option of using a same screw for the implant and for the base.

Optionally, for example as shown in FIG. 3B, the inner surface of the external wall is optionally configured to receive a bottom portion of a restoration or superstructure. Optionally this surface has a non-circular anti-rotation configuration 343. Optionally, for example as shown in FIG. 3B, the inner surface 125 of the external wall 120 has a peripheral channel 333 defined therein. This enables retention of base 100 to an implant driver, such by a snap fit connection, which optionally is a same tool used to retain the implant 202.

FIG. 3B also shows a matching between base 100 and implant 202, in accordance with some embodiments of the invention. Optionally, the matching is by fitted tapering sections 408 (on implant) and 410 (on base). Optionally, use of tapering provides a greater friction as base 100 is screwed in tighter. Optionally, the tapering do not exactly match, for example, tapering 410 being greater, for example, at least at a top 30% thereof. Optionally, this allows for a snugger fit. Optionally, the difference is tapering is between 0.2 and 3%, for example, about 1%. Optionally or alternatively, the outer diameter of a part of section 410 is greater by between 0.01 mm and 0.1 mm than the inner diameter of section 408.

Figure 2:
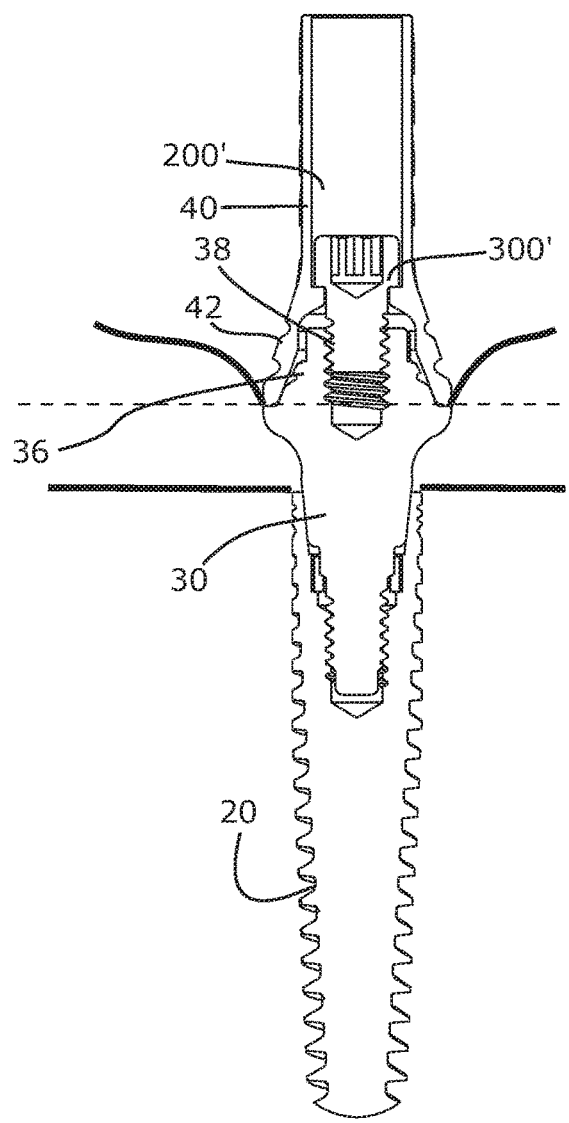
FIG. 2 is a vertical sectional view of a prior art dental implant, base, superstructure and screw.

It may be illustrative to compare FIG. 3A with the prior art of FIG. 2.

In particular, it is noted that screw 38, at its lowest portion, lies well above the top of implant 20. Also, it is noted that a superstructure 40 has a wide skirt 42 to fit over cone section 36. This may increase visibility and/or weaken the restoration where molded on or attached to skirt 42 (e.g., because it will need to be thinner). Also, it is noted that the body of screw 38 does not contact superstructure 40 over a significant length, while in FIG. 3A it does along a considerable length thereof, for example, between 0.2 and 5 mm, for example, between 2 and 4 mm, for example, about 3 mm. This may assist in providing a narrower system.

Finally, it is noted that the diameter of connector 30 (e.g., often the widest part of the implant system, or at least of the above bone areas) is larger than that of base 100, for a same size implant, which is expected to increase visibility of connector 30 after the dental reconstruction is completed. Optionally or alternatively, to aesthetic considerations, it is possible that using a narrower base will allow better healing and/or health for the gingival.

In general, it is noted that for a given implantation, there is a fixed amount of height between the top of the implant and the top of the restored tooth. In some exemplary embodiments of the invention, more of this height is available for in a narrow diameter in some embodiments of the invention, than in the art.

Figure 4A:
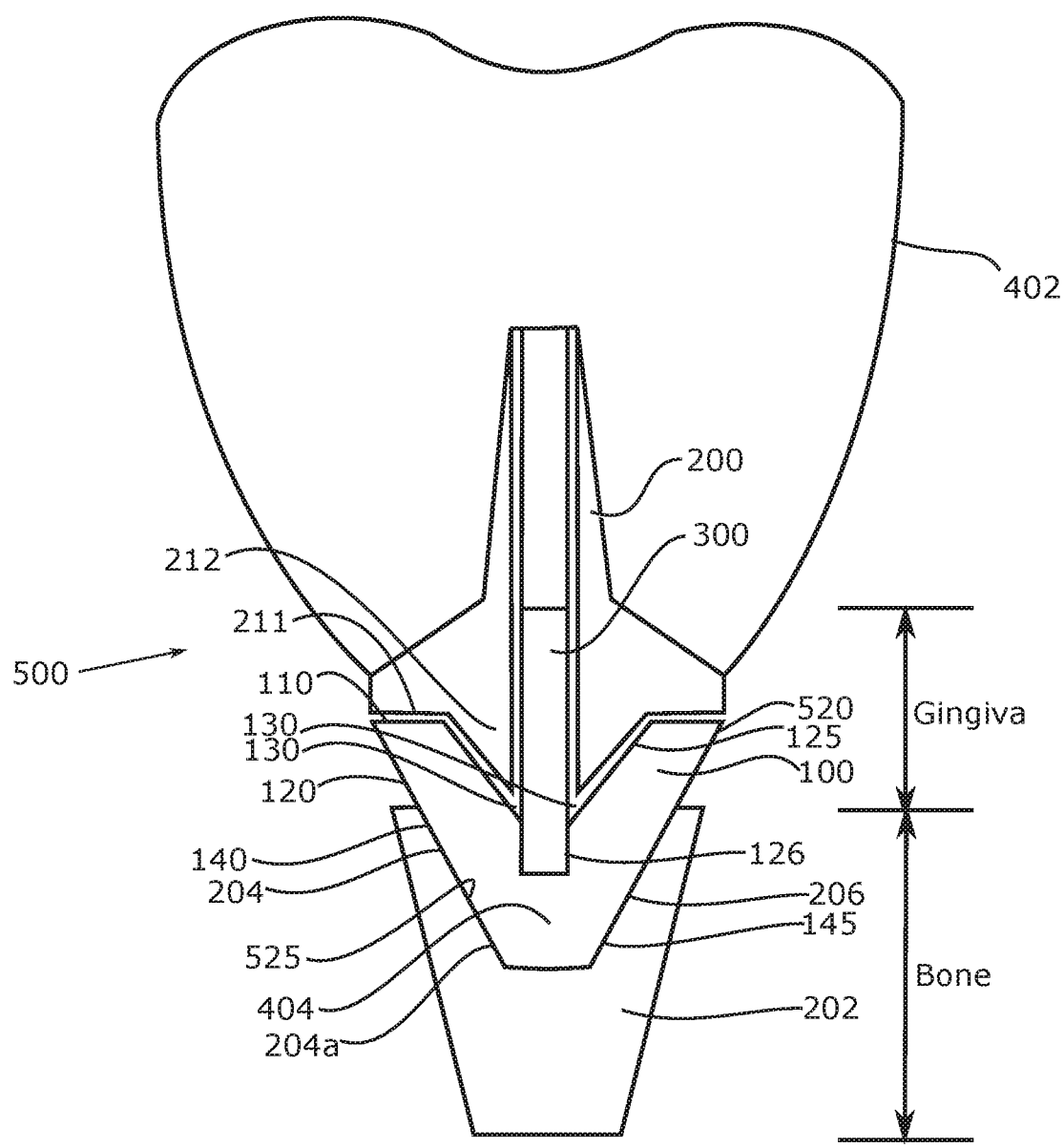
FIG. 4A is a schematic view of an abutment implant system, in accordance with some embodiments of the invention.

In some embodiments, in a combination of base 100 in any of the options stated above together with a superstructure, a screw 300 is provided that screws into the internally threaded portion 126. Optionally, the screw 300 is between 2 and 7 mm, for example, about 5 mm FIG. 4A is a schematic showing of an implant system 500, in accordance with some embodiments of the invention, including an implant 202, a base 100 (e.g., of any of the specific designs shown herein), a superstructure 200 and a screw 300 and a general height and/or other relationships between them. Also shown is a restoration 402, optionally formed on superstructure 200 or otherwise connected thereto. Similar reference numbers are used to help with the comparison between the specific examples and this more generalized drawing.

As shown, implant 202 may include a cavity 404, which has a threading 204 therein.

FIG. 4A shows an exemplary relationship, in which it can be seen that superstructure 206 is mounted on and also in base 200, a screw 300 which couples superstructure 206 to base 100 extends below a bone level (e.g., top of implant 202) and base 100 is optionally wider at the bottom of a cavity 130 thereof than at a lowest part thereof, to provide a wall to surround and support screw 300. Optionally, in an upwards direction, the diameter of the base stays as narrow as in the connection to the implant until and if mechanical strength issues force the diameter to grow. It is noted that while the term "diameter" is used, in some embodiments, the base is not circular in cross-section rotationally symmetric, for example, having an elliptical or a polygonal, optionally rectangular or triangular cross-section. Diameter in such cases refers to the largest extent in the cross-sectional plane.

Also illustrated schematically is the mating between various parts which is optionally by over fitting (e.g., slight mismatch of tapers or geometry), so as to provide good mechanical coupling, sealing and/or friction to avoid device disassembly.

For example, in one option, base 100 comprises an external wall 520. External wall 520 is optionally the same as external wall 120 or in another option is a full external wall 520 that includes external wall 120 and lower external wall 140. For example, external wall 520 extends downward from top 110 and optionally includes an externally threaded portion 145 configured to mate with the internally threaded implant wall portion 204 and thereby fit base 100 into implant 202. Furthermore, optionally, an inner surface 125 of external wall 520 optionally extends downward from top 110 so as to define a cavity 130 inside the base 100. The inner surface 125 may have an internally threaded portion 126. Optionally, at least part of the internally threaded portion 126 is below a height of the inner surface 125 that corresponds to a top height of the implant 202.

Base 100 of implant system 500 optionally is structured in accordance with any of the possible options and embodiments described in connection with base 100 above. For example, a bottom 133 of the cavity 130 extends more than half a distance from top 110 to an uppermost part of the externally threaded portion 145 as measured along a height of the base 100 of implant system 500 in one version. Optionally or alternatively, most of the internally threaded portion 126 is below the height of the inner surface 125 corresponding to the height of the top 110.

In some embodiments of the invention, a lowest inclined section 525 of external wall 520 of base 100 (optionally with a threaded section below it) matches a corresponding portion 204a of internal implant wall 204 of the implant 202. Optionally, portion 204a is not inclined and is sized to pass through and optionally snugly engage an indexing portion of the implant cavity. In some embodiments, the base 100 is narrower than the implant 202 at a height just above the implant 202.

In some embodiments, base 100 is used for restoration of an individual tooth. Optionally the narrowness of the base assists in achieving an esthetic effect. Optionally, when restoring a single tooth, there is no need for off-axis insertion, so an entry taper into cavity 130 can be 5 degrees or less.

Potential Advantages of Certain Embodiments of the Invention

As a result of the depth of penetration of the cavity 130 within base 100 and of the depth of penetration of internally threaded portion 126 within base 100, a screw 300 held within cavity 130 of base 100 (while base 100 is within implant 202) potentially has added mechanical support since screw 300 is indirectly supported and surrounded by implant 202 in addition to being directly surrounded and supported by base 100.

In some exemplary embodiments of the invention, the deepened penetration of internally threaded portion 126 and of cavity 130 inside base 100 also allows external wall 120 to be lengthened considerably. Since the strength of the connection, e.g., mechanical support, provided by external wall 120 between base 100 and a screw 300 or superstructure section 212 restoration can be related to the length and thickness of external wall 120, the additional length of external wall 120 of base 100 provided in some embodiments permits a narrowing of external wall 120 without reducing the total strength of this connection.

In some embodiments of the invention, the length of section 212 (e.g., in cavity 130) provides such mechanical strength and/or stability.

In some embodiments of the invention, cavity 130 is shaped to be long enough above the threaded portion thereof, to receive a significant length of extension 212. Optionally, the part of cavity 130 corresponding to 212 includes an indexing or an anti-rotation section, for example, in hexagonal form.

This narrowing of the widest diameter of base 100 potentially affords an important aesthetic advantage to a user wearing a restoration or other superstructure held by base 100. The narrower the Top of the base, the lower the visibility of the connect unit in the gingiva tissue, an advantage that many patients who need restorations seek. Just above the implant, for example, the base is narrower than the implant (e.g., by between 10 and 30%) in certain embodiments.

Exemplary Base Designs and Variations

FIG. 4A1 is a schematic side view of a base 440z, in accordance with some embodiments of the invention. Of particular note are a top portion 442 whose width is optionally set by a desired taper into a cavity thereof, an implant matching surface 452 whose geometry is optionally selected to match the implant cavity (e.g., length and/or diameter and/or tapering), an indexing passing section 458 optionally sized and shaped to fit into an indexing portion of the implant (optionally contacting but not resisting rotation) and a threaded section 460 optionally sized and configured to engage an inner threaded section of the implant.

A section 450 lies between top 442 and matching surface 452. In various of the embodiments below, section 450 is modified for, for example, aesthetic purposes, to match diameters, to match to various implant sizes and/or cavity shapes, to control a size and shape of a notch above the implant, to provide different heights of implants (e.g., to match gingival thickness and/or implant depth), to provide different axial separations between the bottom of cavity 130 and the top of the implant and/or increase a stability or strength of the connection between the superstructure and base 440z. This may result in a section 450 which includes parts that are tapering, ridged, grooved, cylindrical and/or having other geometries.

Figure 4B:
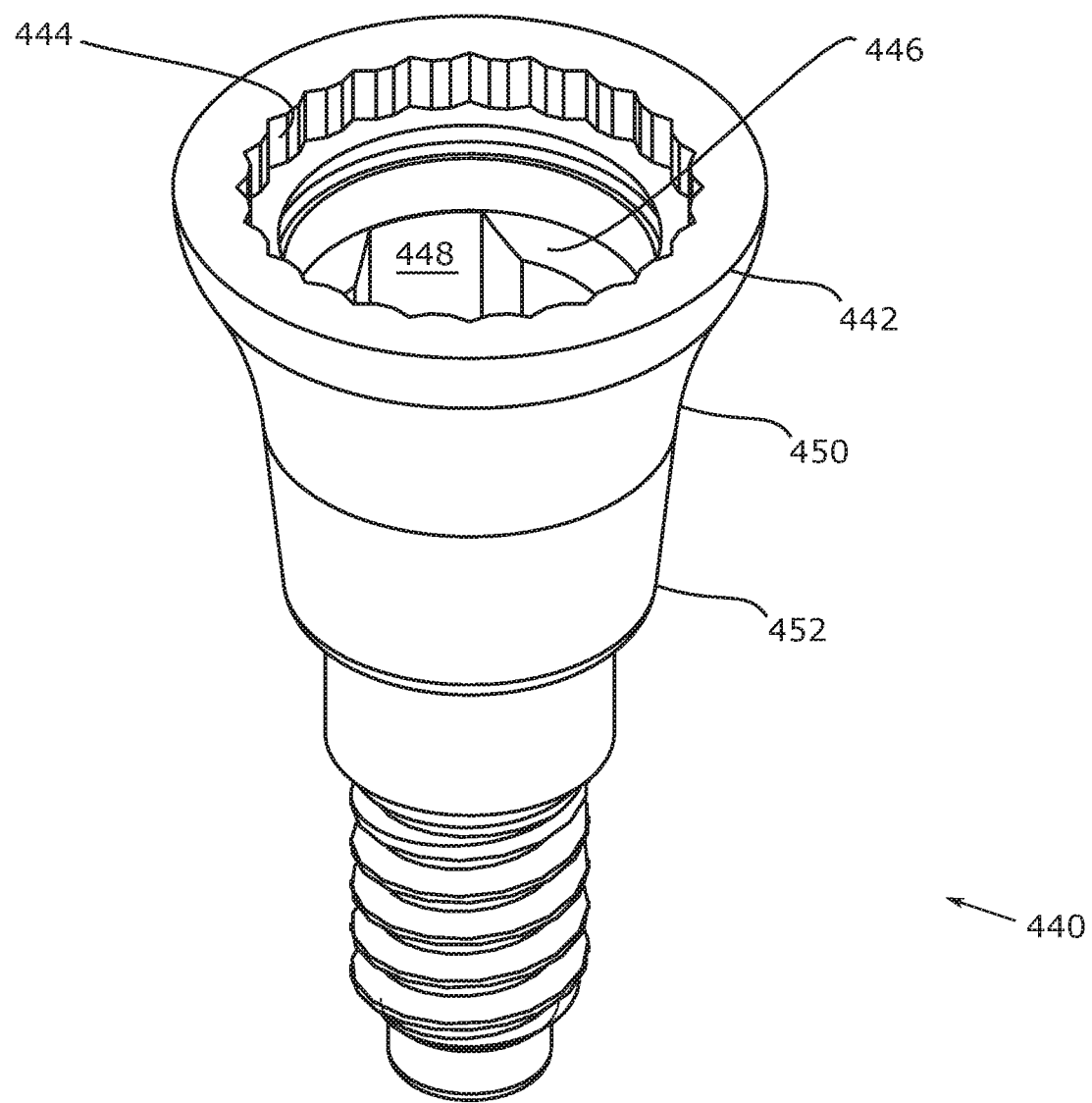
FIGS. 4B, 4C and 4D show various views of a base, in accordance with some embodiments of the invention.

FIGS. 4B-4O3 show various designs of base devices 100, in accordance with some embodiments of the invention. Same or similar numbers will be used for same or similar parts of these base designs. These figures are provided to illustrate both features and complete designs. It is noted that one or more features from one base may be combined with one or more features from another base to provide a base in accordance with some embodiments of the invention. Further, these figures show some examples of relative positions of parts of the base and/or shapes of outside and/or inside surfaces.

Figure 4C:
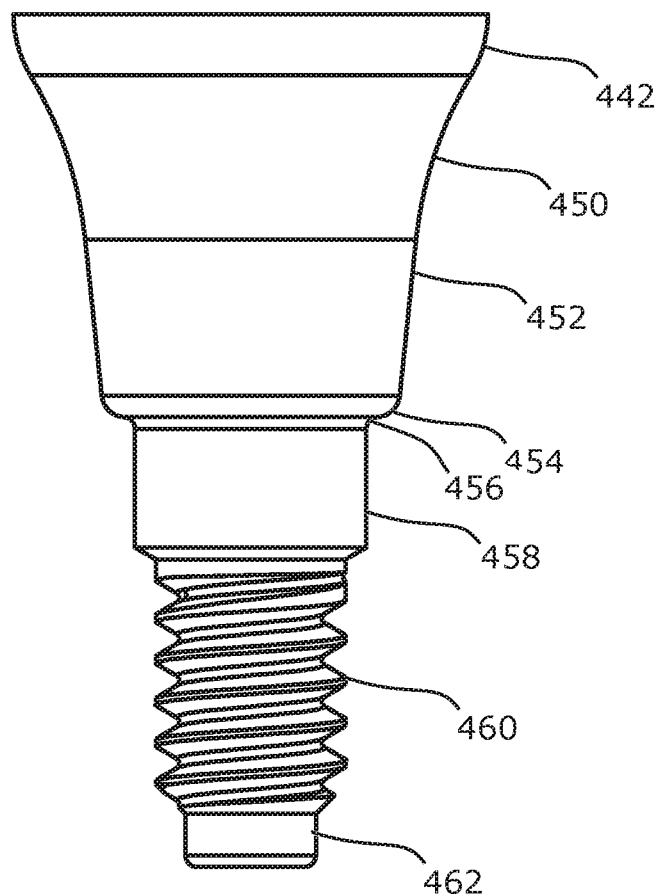
Figure 4D:
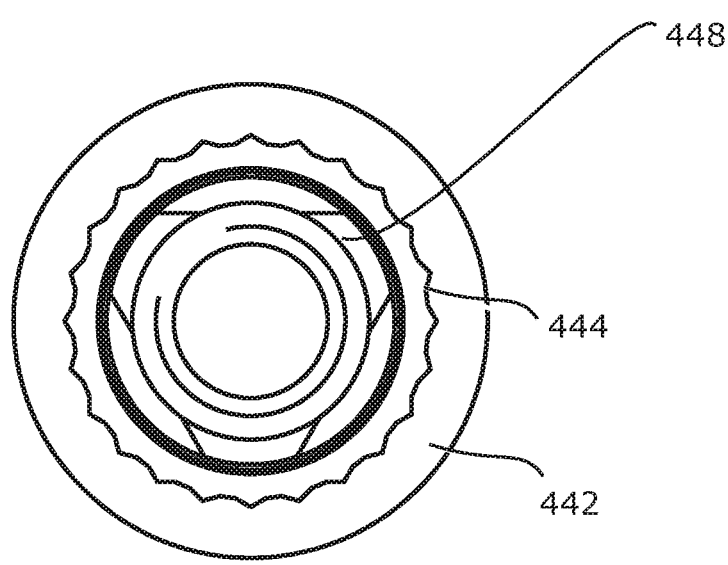

FIGS. 4B-4D show a first base design, 440, in perspective view, side view and top view, respectively, in accordance with an exemplary embodiment of the invention.

Base 440 has a top 442 having an internal surface 444, which is optionally indexed for locking in multiple rotational positions (e.g., with a suitable superstructure). Optionally, the indexing is about every 7.5 degrees, for example, between 7 and 20 degrees. An additional indexing 448 may be provided to prevent rotation of the superstructure, once inserted. Optionally internal indexing 448 is used is for engaging with the implant driver, and upper indexing 444 is for orienting the superstructure. In some exemplary embodiments of the invention, indexing 444 is used with superstructures having shorter sections that fit into base 100 and/or for superstructures where the part that corresponds to indexing 448 is free to rotate relative to indexing 448.

In some exemplary embodiments of the invention, top 442 is sized according to the type of restoration, for example, it may be greater in diameter to support some types of dental restoration.

Base 440 defines an internal cavity 446 which may be internally threaded at a bottom part thereof.

Progressing downwards from top 442, an inward tapering section 450 is shown which has a less tapering (or cylindrical) section 452 below it which is optionally configured to fit inside the implant and fit against a wall of an inner cavity of the implant. In some embodiments of the invention, section 452 is intended to be within the implant and is designed to be compatible with the implant's cavity. Optionally or alternatively, section 450 is intended to be in contact with the gingiva and is designed in response to considerations of the gingiva, for example, the height of the gingiva, the width at the buccal side and the direction and form in which the base erupts form the gingiva.

An optional narrowing 454 defines a lowest part of the base which is taperingly engages the implant and a surface 456 below it is optionally machined so as to not interfere with the upper edge of indexing 448 to match an aperture rim of an implant.

Below, is a section 458, optionally inward tapered, which engages a lower part of the inner cavity of the implant. Further below is a threaded section 460 which engages a matching threaded section of the implant. A bottom tip 462 optionally fits in, optionally snugly, in a bottom of the cavity of the implant.

Figure 4E:
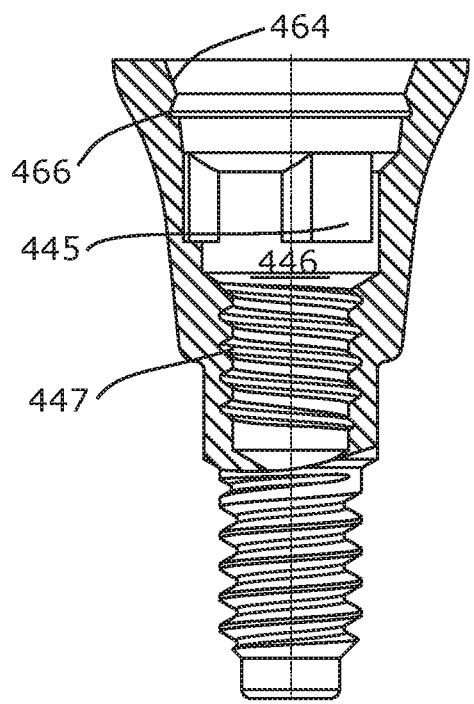
FIGS. 4E, 4F and 4G show various views of a base, in accordance with some embodiments of the invention.
Figure 4F:
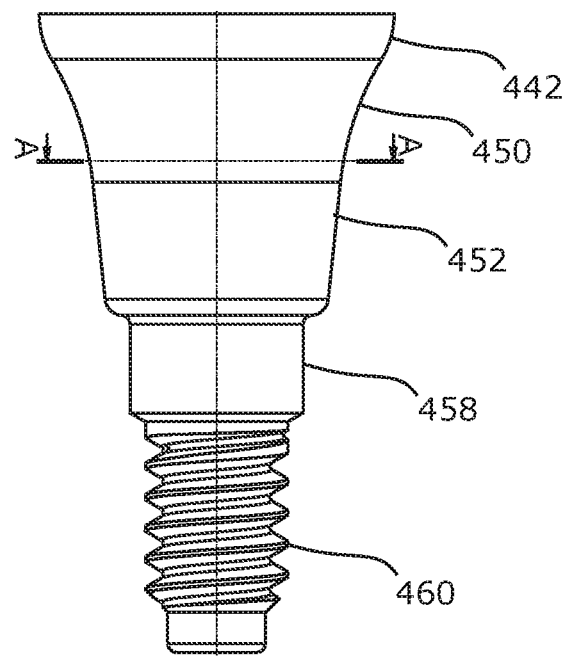
Figure 4G:
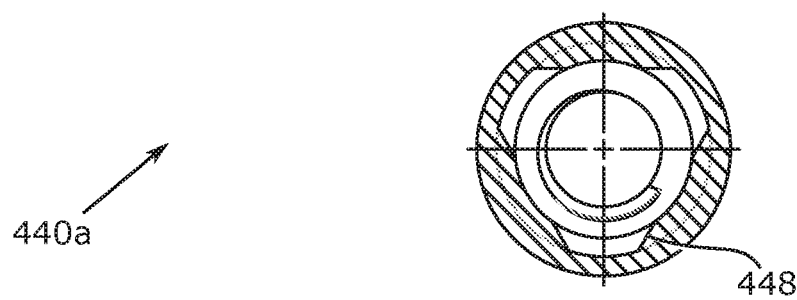
Figure 4M:
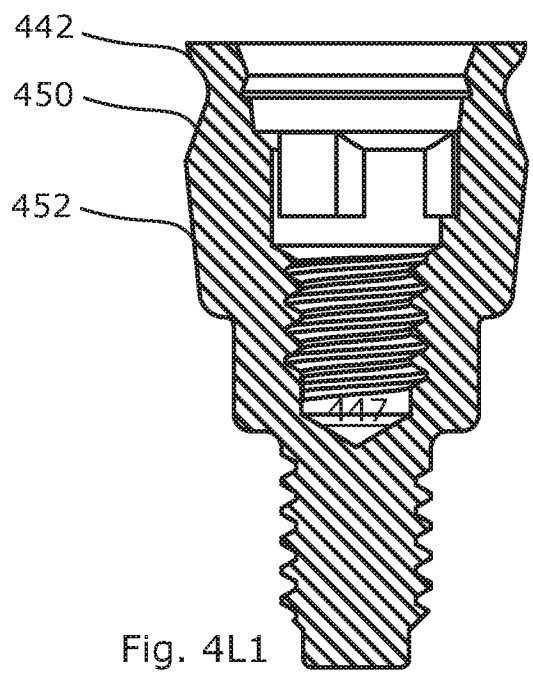
Figure 4M:
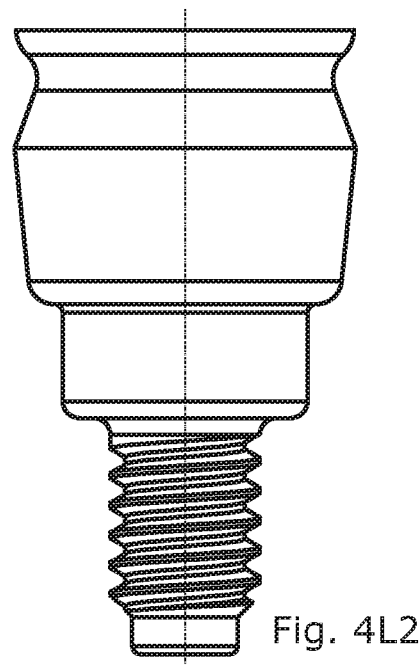
Figure 4M:
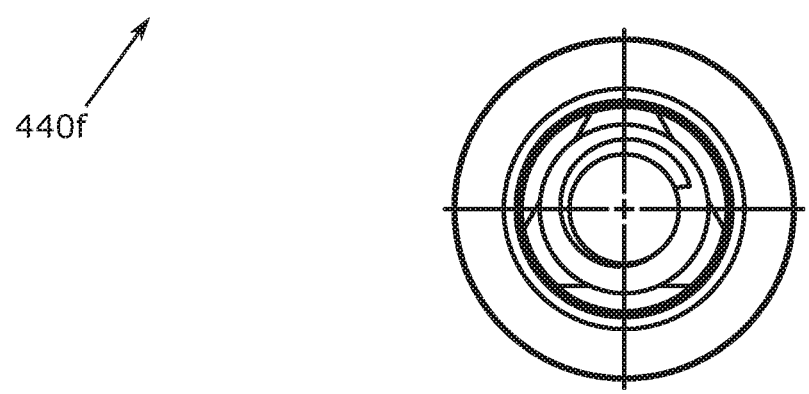

FIGS. 4E-4G are a side view, side cross-sectional view and axial cross-sectional view of a base 440a, which may be the same as base 440, except for an optional lack of indexing 444.

Referring specifically to FIG. 4F, an inward tapering 464 (e.g., with an angle between 35 and 45 degrees) is optionally provided to assist in non-axial insertion of abutments therethrough. An undercut 466 is optionally provided to interlock with a holding tool (not shown). Optionally, the geometry of this undercut (or other snap-fit design) is similar enough to that found on a dental implant, so a same tool can be used to hold both.

Cavity section 446 optionally has two main parts, from top down: a superstructure holding section 445 including a tapering and an indexing section, and an internally threaded section 447 to hold a screw. Optionally, superstructure holding section 445 (typically terminating at the bottom of indexing 448), is long enough to engage, for example, between 15% and 30% of a total height of the superstructure.

Optionally, screw holding section 447 is sized to hold the screw. As noted herein, a significant part of the screw holding section and possibly part of the superstructure holding section are at a level of the implant or below.

FIG. 4G is an axial cross-sectional view showing indexing 448.

FIGS. 4H1-4H3 are side, side cross-sectional and axial cross-sectional views of an exemplary variant base, 440b, illustrating various options, for example, a design in which there is no undercut 466, in which indexing section 448 is hexagonal and/or longer, in which tapered section 464 is longer, in which section 452 has a greater tapering and/or in which section 450 is scalloped.

FIGS. 4I1-4I2 are side and side cross-sectional views of a base 440c, in accordance with some embodiments of the invention. Inner threaded portion 447 and outer threaded portion 460 are shown before thread formation. As can be seen, part of indexing portion 448 can lie below the implant level (e.g., below the top of section 452), which means part of the superstructure may be surrounded by the implant, Also shown is the option of section 450 being significantly smaller in diameter than section 452. This may be if section 452 is made wider to match an implant geometry, but wall thickness is not needed in section 450 for reasons of strength. Also to be noted is a greater length of tapering 464 (e.g., as compared to base 440a).

FIGS. 4J1-4J3 are side, side cross-sectional and detail views of a base 440d, in accordance with some embodiments of the invention. In particular, when compared to base 440a, section 450 is longer, so tapering of this section can be more gradual. Optionally or alternatively, section 458 is longer to match a different implant design. Also, this allows screw holding cavity 447 to be higher above section 460.

FIGS. 4K1-4K3 are side, side cross-sectional and detail views of a base 440e, in accordance with some embodiments of the invention. In particular, when compared to base 440d, section 450 is extended, for example, to match a situation where the gingival is thicker and/or where the implant is implanted lower (e.g., below the bone, for example, as described with regard to peri-implantitis).

FIGS. 4L1-4L2 and FIG. 4M are side, side cross-sectional and detail views of a base 440f, in accordance with some embodiments of the invention. In particular, for example due to use with an implant having a larger diameter cavity, section 52 has a greater diameter. Section 450 may then have a reduced diameter, which presents as a recess (shown here as a gradual change in diameter and in FIG. 4I1 as a sudden change in diameter) between sections 452 and 442. Such recess may reduce the visibility of base 440f when implanted.

FIGS. 4N1-4N2 are side and side cross-sectional views of a base 440g, in accordance with some embodiments of the invention. In particular, when compared to base 440a, section 450 is elongated, which may increase the distance between section 447 and section 460.

FIGS. 4O1-4O3 are side, side cross-sectional and detail views of a base 440h, in accordance with some embodiments of the invention. In particular, when compared to base 440f, section 450 is made longer and/or cavity 447 is distanced from section 460. As shown, section 450 gradually tapers down from the diameter of section 452 (which is made to match the implant). However, it can also have a step, so that section 450 is thinner all along. Optionally, section 450 is cylindrical or tapers up (e.g., from such step).

FIGS. 4P1-P3 show various views of a superstructure 480 attachable to a base 100, in accordance with some embodiments of the invention. Referring specifically to FIG. 4P3, a side cross-sectional view. Superstructure 480 includes a body 482 having one or more optionally irregularities 484 thereon, for example, for mating or mounting thereon a restoration tooth. A lower end of superstructure 480 includes an optional insert 486 which fits into cavity 130 of base 100.

In some exemplary embodiments of the invention, insert 486 is indexed for rotation. An example may be seen in FIG. 4P2. In some exemplary embodiments of the invention, the indexing is hexagonal with two lengths of sides. This may allow the superstructure to fit in two (or more) types of base, those which have an internal hexagonal connection and those which have an internal cone connection. See also below with reference to FIGS. 4R1-4R3 and 4S1-4S3.

A face 490 optionally mates with top 110 of base 100. Optionally, face 490 projects 492 and defines a diameter greater than that of body 482 and a skirt or a step 494 provides continuity between the different diameters. As noted here, in some exemplary embodiments of the invention, this skirt is short.

A screw channel 496 is optionally defined for screw 300 to attach superstructure 480 to base 100. Optionally, channel 496 is narrower than a channel 499 in body 480, and a step or other interface 498 therebetween serves to support the head of screw 300. Optionally, inner threading is provided in channel 496 and/or channel 499.

Figure 4Q:
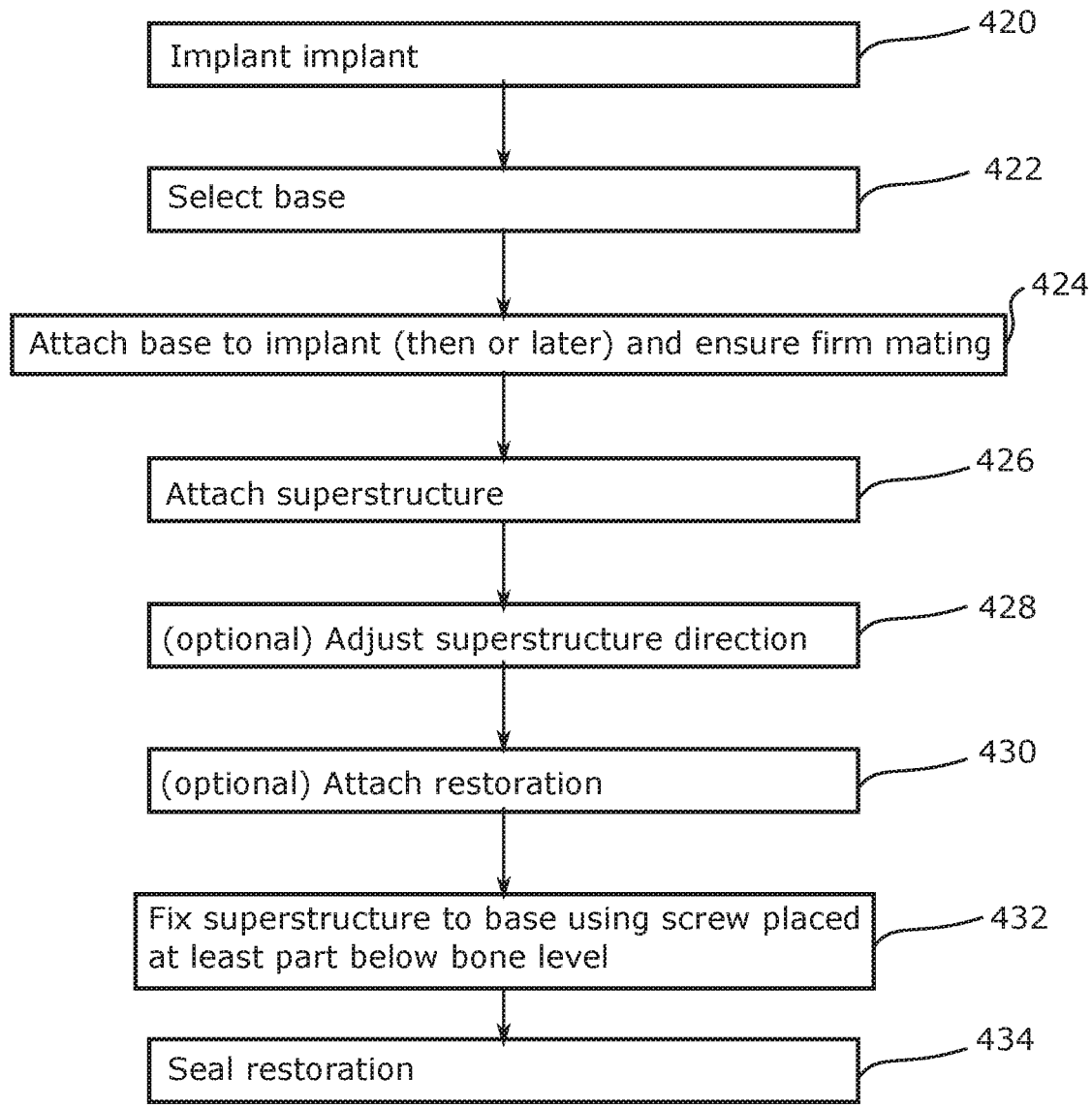
FIG. 4Q is a flow chart of an implantation method, in accordance with some embodiments of the invention.

FIG. 4Q is a flowchart of a method of using a base 100, in accordance with some embodiments of the invention.

At 420, optionally after suitable planning activities, an implant is implanted in jaw bone.

At 422 a base is selected, for example, based on implant size (matching the base to the cavity of the implant) and gingival height.

At 424, the base is attached to the implant, for example, by screwing it in. Optionally, such connection provides matching between an inner surface of a cavity of the implant and an outer surface of the base, so that these is a good mechanical coupling.

At 426, a superstructure is selected and attached to the base.

In some exemplary embodiments of the invention, the superstructure is multi-directional (e.g., there is an angle between the axes of body 482 and insert 486). The superstructure may be rotated (428) until oriented as desired. As noted, some base designs allow rotation in steps of 60 degrees and some have a better resolution, such as less than 30, less than 10 or, for example, 7.5 degrees.

430-434 represent an example of post implantation activity. These may vary depending on the type of dental restoration and the particular workflow of the practitioner.

At 430, for example, if the restoration is not already mounted on the superstructure, the restoration is mounted and optionally checked.

At 432, the superstructure is fixed to the base, optionally below bone level, for example, using screw 300.

At 434, the restoration is optionally sealed (e.g., if screw 300 was inserted through it) and the procedure is optionally completed.

FIGS. 4R1-R3 show superstructure 480 mounted in base 440a, in accordance with some embodiments of the invention and FIGS. 4S1-S3 show superstructure 480 mounted in base 440b, in accordance with some embodiments of the invention. As can be seen, a same type of superstructure can fit both types of indexing of bases 440.

Referring to FIGS. 4R1-R2 and 4S1-S2, flange 492 is shown abutting against a top of base 440. An optional tapering portion 488 matches tapering 464 (if present), and optionally provides a friction lock therebetween. Extension 486 is shown fitted against indexing 448a or 448b and in cavity 445. This optionally provides stability (e.g., once a screw 300 attaches base 440 to superstructure 480).

Referring specifically to FIGS. 4R3 and 4S3, the matching between extension 486 and two types of indexing is shown. FIG. 4R3 shows extension 486 fit in a trox-like indexing 448a. Extension 486 has long sides 483 and short sides 485. Sides 447 lie against long sides 447 of indexing 448a and sides 485 optionally do not reach short sides 449 of indexing 448a. As can be seen, however, there is a snug and stable fit between extension 486 and indexing 448a, at least on three sides.

FIG. 4S3 shows extension 486 fit in a hexagonal indexing 448b. Sides 485 lie against three of the sides 443 of indexing 448b and sides 483 optionally do not reach their corresponding three sides 443. As can be seen, however, there is a snug and stable fit between extension 486 and indexing 448b, at least on three sides.

Also referring to FIGS. 4S1 and 4R1, the shape of extension 486 and its relationship with cavity 445 can be seen. In particular, extension 486 optionally has a small outer diameter, for example, less than or about that of body 482. Optionally or alternatively, extension 486 has an internal screw channel which snugly fits a screw 300 when inserted therein for attachment to base 440. Optionally or alternatively, extensions 486 extends at and/or below inwards tapering section 464. Optionally, such tapering and position of the extension is blow a substantially flat top of base 440, which optionally defines its widest point. In some exemplary embodiments of the invention, superstructure 480 does not include any parts which surround a part of base 440. In some exemplary embodiments of the invention, extension 486 is generally cylindrical and/or frusto-conical, over, for example, at least 50% of its length.

While not necessarily limited to any particular material, as any dental-compatible materials may be used, In some exemplary embodiments of the invention, base 440 and/or superstructure 480 are formed of titanium or a titanium alloy.

Per-Implantitis

Figure 5A:
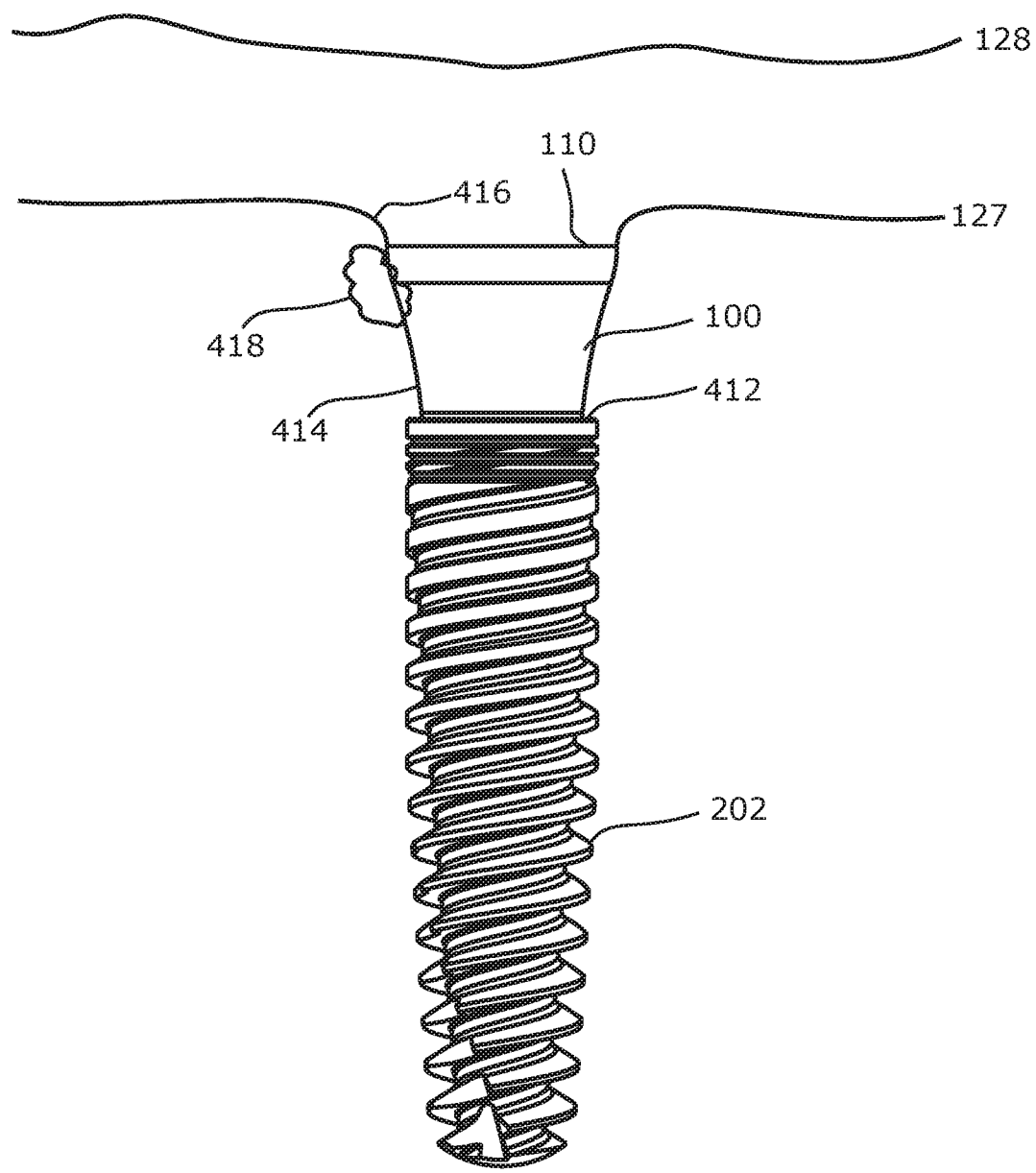
FIG. 5A is a side view of an implant implanted below bone level in a manner suitable for treatment of peri-implantitis, in accordance with some embodiments of the invention.

FIG. 5A shows a base 100 used with an implant 202 for potential treatment of peri-implantitis, in accordance with some embodiments of the invention.

Peri-implantitis (418) often occurs at a bone-implant interface, generally starting at a bone-gingiva interface 416. Treatment is traditionally by removing the implant. However, reapplying a new implant so that the restoration is still correctly aligned can be very difficult and/or unpleasant to the patient.

As shown in FIG. 5A, base 100 is optionally used as part of the implant, where peri-implantitis is expected. As shown, a top 110 of base 100 is below a bone level 127. In some embodiments, top 110 is above the bone level, optionally as high as gingival layer 128, but a top 412 of implant 414 is below the bone level, for example, 1 mm, 2 mm, 3 mm or intermediate or greater distances. A superstructure, for example, as described herein, may be mounted on base 100.

Optionally, a lower part of base 100, indicated as 414, which is above the implant but still within the bone is treated to be suitable for bone integration. Optionally or alternatively, part 414 is made wider than shown in FIG. 3A, for example, to provide better contact with the surrounding bone.

In some exemplary embodiments of the invention, the base does not provide a geometrical continuation of the shape of implant 202, for example, having a different texture, surface geometry and/or diameter than the implant.

Optionally, base 100 does not include external threading or rings in part 414, but may have a non-smooth surface.

Figure 5B:
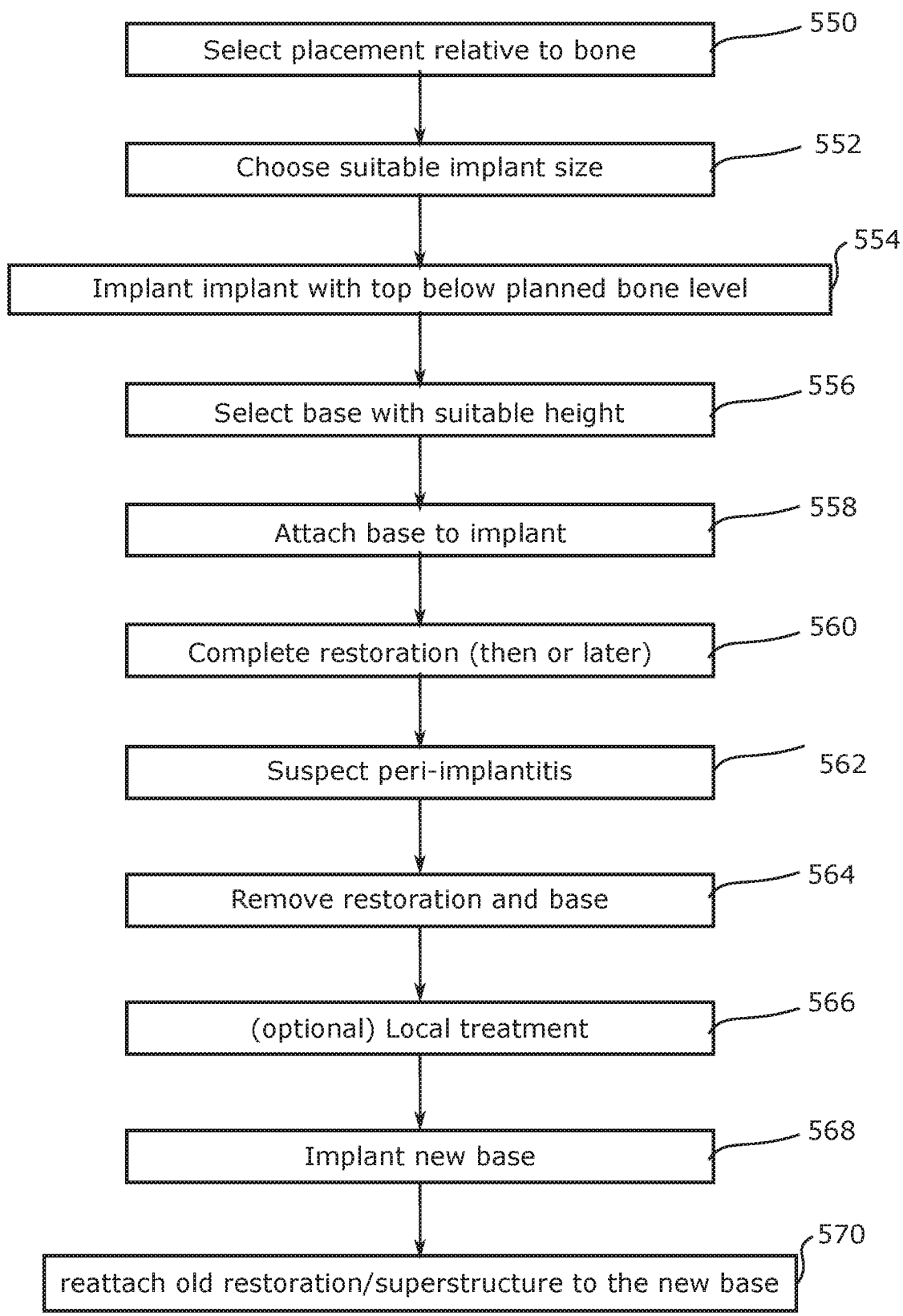
FIG. 5B is a flow chart showing a method of treating peri-implantitis, in accordance with some embodiments of the invention.

FIG. 5B is a flowchart of a method of such implantation and treatment, in accordance with some embodiments of the invention.

At 550, a practitioner selects a below-bone depth for top 412 of implant 202.

At 552, a suitable implant size is chosen, for example, to avoid drilling past a safety depth.

At 554, the implant is implanted (e.g., with any drilling, as needed), so that top 412 is below the bone level 127.

At 556, a base with a suitable height above the implant is selected.

At 558 the base is attached to the implant, with at least a part 414 of an external surface of the implant below bone level 127.

At 560, the restoration is completed (e.g., and attached to the base). In some embodiments, this is done later (e.g., to allow tissue to heal) and base 100 may be plugged and the implantation wound allowed to recover.

At 562, peri-implantitis may be suspected, for example, due to bad breath, pain, discharge, implant instability, imaging and/or visible inflammation. Optionally or alternatively to peri-implantitis, implant/site treatment may be triggered by bone resorption or lack of growth.

At 564, the restoration and base 100 are removed, exposing (hopefully) any diseased tissue.

At 566, such diseased tissue is treated.

At 568, a new base is optionally attached to the implant, optionally similar to or the same base, re-sterilized.

At 570, the old restoration may be attached and is expected to be correctly aligned, optionally due to the alignment being set by the implant (other than superstructure rotation), which does not move.

General

It is expected that during the life of a patent maturing from this application many relevant abutments, copings, restorations and dental implants will be developed. For example, the shape and manner of insertion and/or attachment of a screw into a base or the manner of interfacing a superstructure to a base may differ in the future. The scope of the terms abutments, copings, restorations and dental implants is intended to include all such new technologies a priori.

The term "about" means "within 10% greater or smaller than", unless otherwise clear from the context.

The terms "comprises", "comprising", "includes", "including", "has", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A base for securing a superstructure to a dental bone implant using an attachment screw, said base comprising:
   a flat top surface located at a widest portion of the base, said top surface being the uppermost surface of the base and within 1 mm of a widest point of said widest portion;
   a lower tip of the base; said lower tip including an externally threaded portion configured to mate with said bone implant;
   an external wall extending downward from the top;
   an inner surface of the external wall extending downward from the top so as to define a cavity inside said base, the inner surface having an internally threaded portion;

wherein said inner surface of the external wall is inward-tapering such that the cavity is inward-tapering from said top surface;

wherein said cavity includes an unthreaded portion greater in diameter than that of the threaded portion thereof, thereby defining a superstructure receiving cavity section such that an extension of said superstructure can fit in said superstructure receiving cavity section; and said attachment screw can pass through said extension of said superstructure, said screw fitting said internally threaded portion; and wherein the unthreaded portion of the inner surface of the external wall has, above said internally threaded portion, a non-circular anti-rotation configuration shaped to receive a bottom portion of the superstructure; said non-circular anti-rotation configuration is located below said inward-tapering and above said internally threaded portion;

further wherein said internally threaded portion is all below said widest portion of said base.

2. The base of claim 1, wherein at least part of the internally threaded portion extends below one-quarter of a height from the top to the lower tip.

3. The base of claim 1, wherein the threading of the internally threaded portion and the threading of the externally threaded portion both match a same screw geometry.

4. The base of claim 1, wherein said unthreaded portion of said cavity is at least 20% by length of said cavity.

5. The base of claim 1, wherein said superstructure receiving cavity section is between 30% and 60% by length of said cavity.

6. The base of claim 1, wherein the ratio of the length of said superstructure receiving cavity section to the outer diameter of the top is 1:2.

7. The base of claim 1, wherein the widest portion of the base is not more than 4 mm.

8. The base of claim 1, wherein the external wall extends downward from the top to at least 7 mm in depth.

9. The base of claim 1, wherein the external wall above a point where said base meets said implant comprises a wall thickness average lower than said point where said base meets said implant.

10. The base of claim 1, wherein the external wall has a minimum thickness of at most 2 mm.

11. The base of claim 1, wherein a height of the external wall exceeds an outer diameter d of the top.

12. The base of claim 1, wherein an outer diameter of the top of the base does not exceed 4.5 mm.

13. The base of claim 1, wherein the internally threaded portion is from about 1.5 mm to about 4.5 mm long.

14. The base of claim 1, wherein the inner surface of the external wall has a peripheral channel defined therein.

15. A method of using a base and to secure a superstructure, comprising: providing the base of claim 1,
    inserting an implant into a bone, the implant having an internal implant wall that includes an internally threaded implant wall portion and an external implant threading;
    inserting the base into the implant, said base including the cavity with the internally threaded portion for receiving a screw; and
    inserting the screw through a superstructure and into the base,
    wherein the cavity is deep enough such that at least part of the screw inside the base is surrounded and supported by the base and part of the implant surrounding the base.

16. The base of claim 1, wherein at least 60% of the internally threaded portion is below a height of the inner surface that corresponds to a height of the top of the implant.

17. The base of claim 9, wherein said wall thickness average is about 0.5 mm.

18. The base of claim 1, wherein said top surface is in a plane lateral to the axial axis of the base and within 1 mm of the widest point of said widest portion of the base.

19. The base of claim 1, wherein said top surface is formed completely in a plane lateral to the axial axis of the base forming said widest and uppermost portion of the base.

* * * * *